US011971241B2

(12) United States Patent
Hamilton

(10) Patent No.: US 11,971,241 B2
(45) Date of Patent: Apr. 30, 2024

(54) SELF-CENTERING GUIDE ROD SYSTEM FOR A RIFLE SCOPE TURRET

(71) Applicant: Sheltered Wings, Inc., Barneveld, WI (US)

(72) Inventor: Samuel J. Hamilton, Barneveld, WI (US)

(73) Assignee: SHELTERED WINGS, INC., Barneveld, WI (US)

( * ) Notice: Subject to any disclaimer, the term of this patent is extended or adjusted under 35 U.S.C. 154(b) by 0 days.

(21) Appl. No.: 17/508,179

(22) Filed: Oct. 22, 2021

(65) Prior Publication Data

US 2022/0042768 A1    Feb. 10, 2022

Related U.S. Application Data

(63) Continuation of application No. 16/436,182, filed on Jun. 10, 2019, now Pat. No. 11,156,435.

(60) Provisional application No. 62/682,502, filed on Jun. 8, 2018.

(51) Int. Cl.
*F41G 1/38* (2006.01)
*G02B 7/02* (2021.01)
*G02B 23/16* (2006.01)

(52) U.S. Cl.
CPC ............ *F41G 1/38* (2013.01); *G02B 7/023* (2013.01); *G02B 23/16* (2013.01)

(58) Field of Classification Search
CPC ........... F41G 1/38; F41G 11/00; G02B 23/16; G02B 7/02
See application file for complete search history.

(56) References Cited

U.S. PATENT DOCUMENTS

| 3,270,418 | A | 9/1966 | Simeone et al. |
| 6,309,133 | B1 | 10/2001 | Curreno |
| 6,351,907 | B1 | 3/2002 | Otteman |
| 11,156,435 | B2 * | 10/2021 | Hamilton ............... G02B 7/023 |
| 2007/0062091 | A1 | 3/2007 | Thomas et al. |
| 2012/0154907 | A1 | 6/2012 | Schmitt et al. |
| 2013/0276345 | A1 | 10/2013 | Hamilton |
| 2015/0316350 | A1 | 11/2015 | Hamilton |
| 2015/0323778 | A1 | 11/2015 | Takahashi et al. |
| 2016/0370146 | A1 | 12/2016 | Hamilton |
| 2017/0363388 | A9 | 12/2017 | Hamilton |
| 2019/0072363 | A1 | 3/2019 | Kilic |

FOREIGN PATENT DOCUMENTS

| CN | 102357820 A | 2/2012 |
| CN | 105241363 A | 1/2016 |
| WO | 2013103661 A1 | 7/2013 |

OTHER PUBLICATIONS

International Search Report and Written Opinion for International Application No. PCT/US19/36349 dated Aug. 27, 2019, 8 pages.

\* cited by examiner

*Primary Examiner* — J. Woodrow Eldred
(74) *Attorney, Agent, or Firm* — Husch Blackwell LLP

(57) ABSTRACT

An optic device turret for adjusting the optical element of the optic device. A spiral cam mechanism is engaged with the turret to define a maximum and minimum adjustment of the optical element. A rotation indicator displays the amount a knob has been rotated.

9 Claims, 28 Drawing Sheets

SELF-CENTERING GUIDE ROD SYSTEM FOR A RIFLE SCOPE TURRET

CROSS-REFERENCE TO RELATED APPLICATIONS

This application is a continuation patent application of U.S. patent application Ser. No. 16/436,182 filed Jun. 10, 2019, which is a non-provisional application of and claims priority to U.S. Provisional Patent Application No. 62/682,502 filed Jun. 8, 2018; each of which are incorporated herein by reference in their entirety.

FIELD

The disclosure relates generally to the field of optic sighting devices. More particularly, the disclosure relates to devices and methods for conveniently adjusting such optics.

BACKGROUND

A turret is one of two controls on the outside center part of a rifle scope body. Turrets are marked in increments and are used to adjust elevation and windage for points of impact change. Conventional turrets have markings on them that indicate how many clicks of adjustment have been dialed in on the turret, or an angular deviation, or a distance compensation for a given cartridge. A click is one tactile adjustment increment on the windage or elevation turret of a scope.

In order to achieve accurate sighting of objects at greater distances, the downward acceleration on the projectile imparted by gravity is of significance. The effect of gravity on a projectile in flight is often referred to as bullet drop because it causes the bullet to drop from the shooter's line of sight. For accuracy at longer distances, the sighting components of a gun must compensate for the effect of bullet drop. An adjustment to the angular position of the rifle scope relative to the rifle barrel is made using the elevation turret to compensate for bullet drop.

Similarly, any horizontal forces imparted on the projectile, such as wind, is of significance. The effect of wind on a projectile in flight is often referred to as drift because it causes the bullet to drift right or left from the shooter's line of sight. For accuracy at longer distances, the sighting components of a gun must compensate for the effect of drift. An adjustment to the angular position of the rifle scope relative to the axis of the rifle barrel is made using the windage turret to compensate for drift.

Conventional turrets allow for multiple rotations in order to enable the scope to compensate for longer-range targets or environmental conditions such as wind. Unfortunately, conventional turrets typically omit at least one of the following functions: adjustment stops that prevent adjustment of the elevation and windage turrets beyond preset amounts, rotation indicator/counter, or turret locking. As a result, users of conventional turrets may lose track of how many rotations are dialed in if they do not carefully count the number of rotations both while dialing away from the zero point and when dialing towards the zero point even when the turret's markings are visible. Furthermore, turrets can be easily bumped, and in dark conditions where it may be difficult to see the turret markings, the user may not realize the turrets have been inadvertently adjusted if the turret lacks a locking mechanism.

Another difficulty with existing rifle scopes is that certain operating conditions require the user to remember both how many clicks and the direction of rotation needed to return the elevation turret to its zero point from a different setting. When light conditions are poor, such as at twilight, night, or in darkened rooms of buildings, or if it is difficult for the user to hear or feel the clicks, it is very easy for the user to lose track of what adjustment is needed to return to the zero point. Under such conditions, the markings may not be sufficiently visible and the absence of a tactile rotation indicator is keenly felt. This is particularly significant for police and military users of firearms, who in the course of their duties may very likely be confronted with a threat under poor lighting conditions. In addition, hunters may hunt at twilight or in deep shade.

Because of the need for compact rifle scope components, markings are necessarily small, making them difficult to read under borderline conditions. While this may be a concern when making fine adjustments, it is of greater concern when a user must make large changes involving several revolutions of a knob, which may lead to an error in the number of revolutions made.

Therefore, a need exists for a new and improved rifle scope with adjustment stops that prevents adjustment of the elevation and windage turrets beyond preset amounts. There is also a need for visual and tactile indication of how many rotations have been dialed in on a turret. Finally, there is a need for a turret locking mechanism so the user can be assured that the turret is still in its last used position. In this regard, the various embodiments substantially fulfill at least some of these needs. In this respect, the spiral cam mechanism according to the present invention substantially departs from the conventional concepts and designs of the prior art, and in doing so provides an apparatus primarily developed for the purpose of preventing adjustment of a turret beyond a preset amount, giving the user an indication of how many rotations have been dialed on the turret, and giving the user the ability to lock the turret.

SUMMARY

One embodiment of the present invention provides an improved rifle scope with adjustment stops, rotation indicator, and locking mechanism, and overcomes the above-mentioned disadvantages and drawbacks of the prior art.

In one embodiment, the devices and methods disclosed herein allow for the locking and un-locking of a rifle scope turret using guide rods and self-centering bushings that avoid binding during actuation.

In one embodiment, a rifle scope turret has self-centering bushings to prevent binding caused by minor mis-alignment of the corresponding guide rods. These floating bushings afford more tolerance in the case of a turret that happens to be actuated at a slight angle from its axis, preventing binding of the turret during actuation. This binding is the primary cause of users not successfully locking or unlocking the current L-Tec turret, so the invention represents a major increase in reliability.

In one embodiment, the disclosure relates to a device comprising a scope body, a movable optical element defining an optical axis enclosed by the scope body, and a turret having a screw operably connected to the optical element for adjusting the optical axis in response to rotation of the screw. The turret has a spiral cam mechanism engaged thereto. The turret defines first and second stop surfaces positioned for engagement by the spiral cam to limit rotation of the turret. The first stop surface defines a zero position of the screw and the movable optical element. The second stop surface defines a maximum point of displacement of the screw and the moveable optical element. The stop surfaces may be defined by a spiral cam groove in the indexing portion of the turret. The spiral cam groove may overlap itself at least partially. The turret may be an elevation turret or a windage turret.

In order to initially sight in an optical sighting device such as a rifle scope, the top cap of the turret must be removed to expose the turret screw and micro adjuster with a given indicia of scale. In order to remove a top cap of a turret, one must generally use a screw driver or coin to unscrew the cap from the turret. Then one must use a screw driver to turn the turret screw.

The applicant has discovered that such a method and mechanism for adjusting the screw turret is not desirable for a number of reasons. First, one must carry with them the tools necessary to take the top cap off, to adjust the screw and to replace the cap. Second, having to take the top cap off, to adjust the screw and to replace the cap takes time which is inconvenient when needing to shoot rather quickly. Third, the act of taking the top cap off, adjusting the screw and replacing the cap could alert the target, such as when hunting. Fourth, changing the micro adjuster with a given indicia of scale to another indicia of scale, for example to account for the effect of bullet drag, altitude, temperature, etc., requires even more disassembly of the turret and further compounds the problems previously discussed.

Therefore, a need exists for a turret that needs no tool to adjust and can be quickly and conveniently changed in the field to account for a number of environmental factors and changes in equipment.

In one embodiment, the invention provides a sighting device that allows movement of an optical element by multiple knobs on a single turret. The sighting device includes a turret, a movable optical element and a screw. The screw is engaged with the movable optical element so that rotating the screw causes the movable optical element to move. The turret includes an outer knob that is operably connected to the screw so that rotating the outer knob causes the screw to rotate. The turret also includes a top knob that is engaged with the movable optical element so that rotating the top knob also causes the screw to rotate. The top knob is also movable between a raised position and a lower position. When the top knob is in the raised position, the top knob can rotate. When the top knob is in the lower position, the top knob cannot rotate.

In another embodiment, the invention provides a sighting device that allows movement of an optical element by multiple knobs on a single turret and tool-less locking and unlocking of at least one knob. The sighting device includes a sighting device body, a movable optical element that is connected to the sighting device body, a turret and a screw. The turret includes a bore, an outer knob and a top knob. The screw is engaged with the movable optical element to move the movable optical element. The screw is also least partially received in the bore so that the screw is rotated by rotating either the outer knob or the top knob. The top knob is movable between a locked position wherein the top knob cannot rotate and an unlocked position wherein the top knob can rotate.

In another embodiment, the invention provides a sighting device that allows tool-less rotation of multiple knobs on a single turret, tool-less locking and unlocking of the knobs and adjustable limits to the rotation of a knob. The sighting device includes a turret. The turret includes an outer knob and a tool-less top knob. The tool-less top knob is movable between a locked position wherein the top knob cannot rotate and an unlocked position wherein the tool-less top knob can rotate. The rotation of the tool-less top knob may be selectively limited. In another embodiment, the invention provides a sighting device that allows tool-less adjustment of an optical element by multiple scales on a single turret. The sighting device includes an optical element and a tool-less means for adjusting the optical element by a first scale and a second scale.

In another embodiment, the invention provides a sighting device that allows tool-less adjustment of an optical element by multiple means on a single turret. The sighting device includes an optical element. The optical element includes a turret. The turret includes a first tool-less means for adjusting the optical element by a first scale and a second tool-less means for adjusting the optical element by a second scale.

There has thus been outlined, rather broadly, the more important features of the invention in order that the detailed description thereof that follows may be better understood and in order that the present contribution to the art may be better appreciated.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
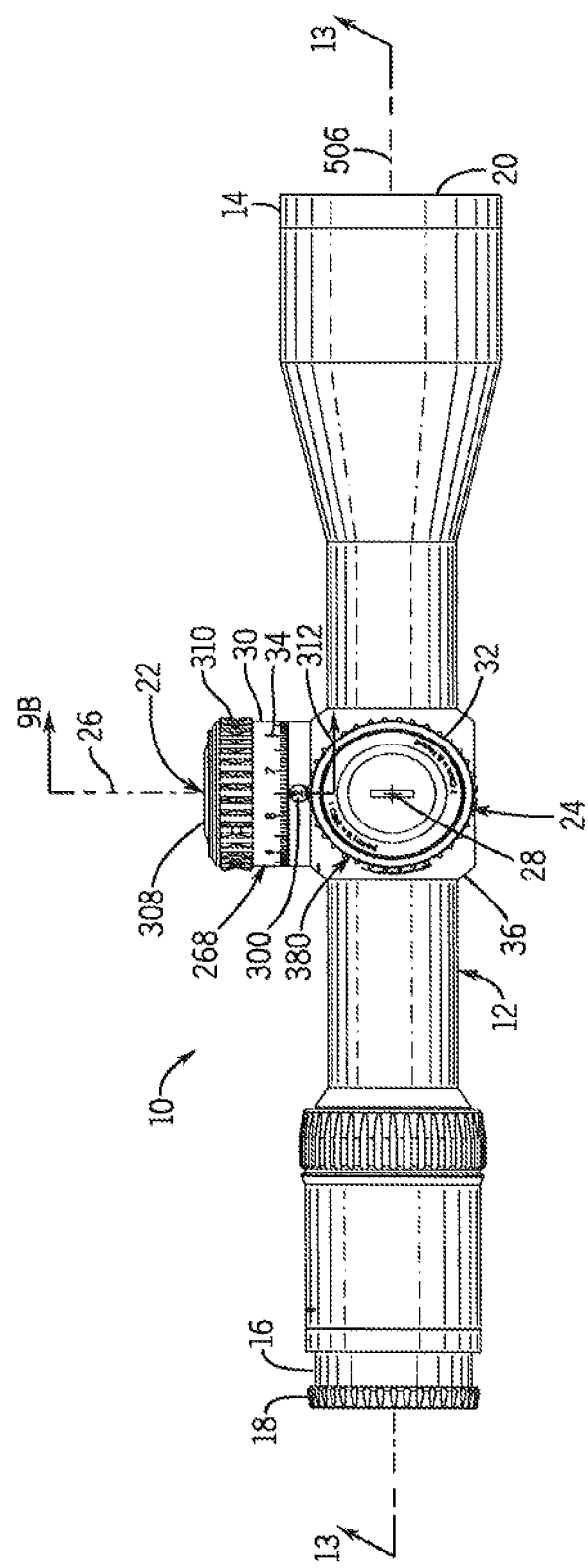
FIG. 1 is a side view of an embodiment of the rifle scope with adjustment stops.

An embodiment of the rifle scope with spiral cam mechanism is shown and generally designated by the reference numeral 10.

FIG. 1 illustrates one embodiment of an improved sighting device, such as a rifle scope with spiral cam mechanism 10. More particularly, the rifle scope or a sighting device 10 has a body 12, in the embodiment shown, a scope body, that encloses a movable optical element 248 (shown in FIG. 13), which is an erector tube. The scope body is an elongate tube having a larger opening at its front 14 and a smaller opening at its rear 16. An eyepiece 18 is attached to the rear of the scope body, and an objective lens 20 is attached to the front of the scope body. The center axis of the movable optical element defines the optical axis 506 of the rifle scope.

An elevation turret 22 and a windage turret 24 are two dials on the outside center part of the scope body 12. They are marked in increments by indicia 34 on their perimeters 30 and 32 and are used to adjust the elevation and windage of the movable optical element 248 for points of impact change. These turrets protrude from the turret housing 36. The turrets are arranged so that the elevation turret rotation axis 26 is perpendicular to the windage turret rotation axis 28. Indicia typically include tick marks, each corresponding to a click, and larger tick marks at selected intervals, as well as numerals indicating angle of adjustment or distance for bullet drop compensation.

The movable optical element 248 is adjusted by rotating the turrets one or more clicks. A click is one tactile adjustment increment on the windage or elevation turret of the rifle scope, each of which corresponds to one of the indicia 34. In one embodiment, one click changes the scope's point of impact by 0.1 mrad.

Figure 2:
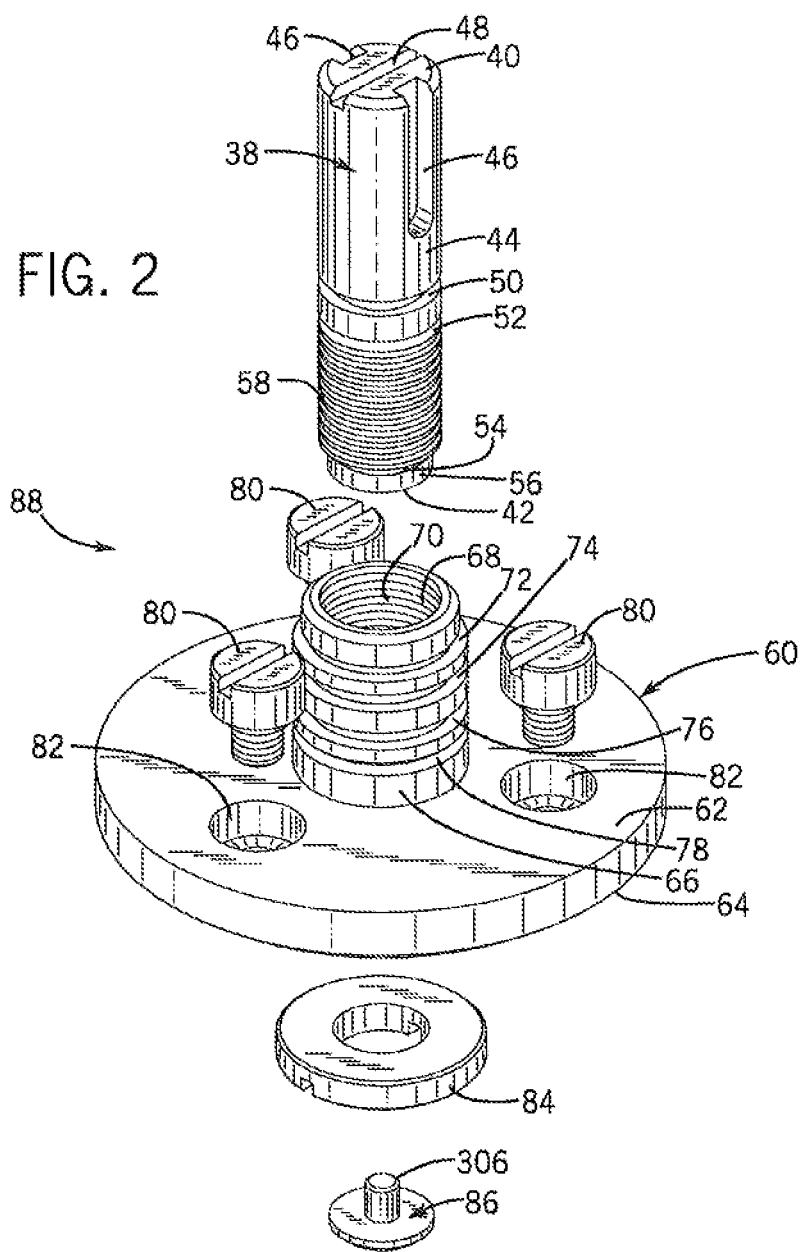
FIG. 2 is a top perspective exploded view of an elevation turret screw subassembly.

FIG. 2 illustrates the improved turret screw subassembly 88. More particularly, the turret screw subassembly consists of a turret screw 38, a turret screw base 60, a friction pad 86, and various fasteners. The turret screw is a cylindrical body made of brass in one embodiment. The top 40 of the turret screw defines a slot 48, and two opposing cam slots 46 run from the top part way down the side 44. Two O-ring grooves 50 and 52 are on the side located below the cam slots. The bottom 42 of the turret screw has a reduced radius portion 56 that defines a ring slot 54. The ring slot 54 receives a retaining ring 84, and a bore 304 in the bottom 42 receives the shaft 306 of the friction pad 86. The side of the turret screw immediately below the O-ring groove 52 and above the ring slot 54 is a threaded portion 58. In one embodiment, the slot 48 is shaped to receive a straight blade screwdriver, but could be shaped to receive a hex key or any other suitable type of driver.

The turret screw base 60 is a disc-shaped body made of brass in one embodiment. A cylindrical collar 66 rises from the center of the top 62 of the turret screw base. The collar has a turret screw bore 68 with threads 70. The exterior of the collar defines a set screw V-groove 78 above the top of the turret screw base, an O-ring groove 76 above the set screw V-groove, an O-ring groove 74 above the O-ring groove 76, and a ring slot 72 above the O-ring groove 74. The turret screw base has three mount holes 82 with smooth sides and a shoulder that receive screws 80.

Figure 3:
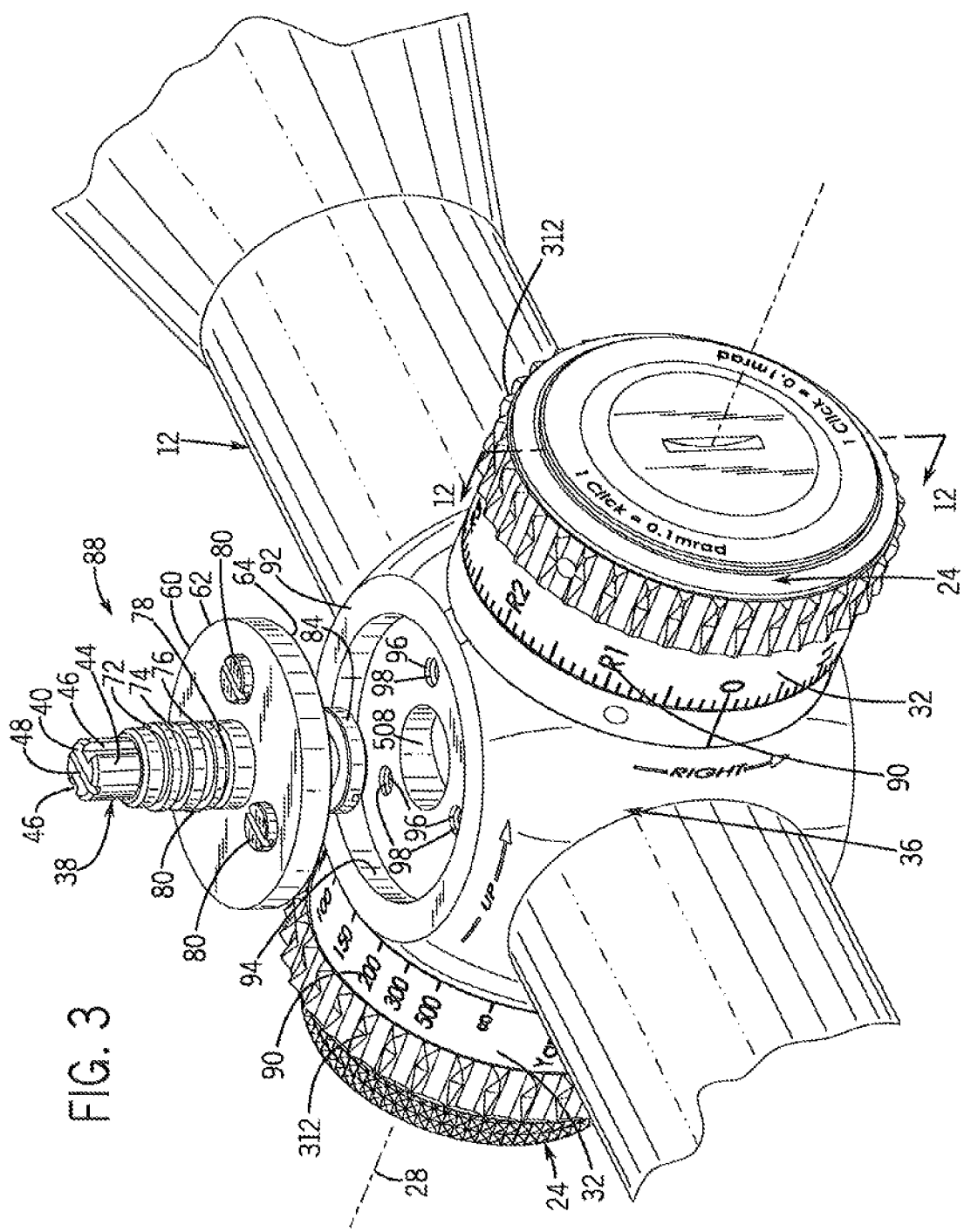
FIG. 3 is a top perspective exploded view of the elevation turret screw subassembly and turret housing.

FIG. 3 illustrates the improved turret screw subassembly 88 and turret housing 36. More particularly, the turret screw subassembly 88 is shown assembled and in the process of being mounted on the turret housing 36. The top 92 of the turret housing defines a recess 94. Three mount holes 96 with threads 98 and a smooth central bore 508 are defined in the top of the turret housing within the recess.

The threads 70 of the turret screw bore 68 are fine such that the turret screw bore may receive the threads 58 on the turret screw 38. The retaining ring 84 limits upward travel of the turret screw so that the turret screw cannot be inadvertently removed from the turret screw bore.

When the turret screw subassembly 88 is mounted on the turret housing 36, screws 80 are inserted into the mount holes 82 and protrude from the bottom 64 of the turret screw base 60. The screws are then screwed into the mount holes 96 in the turret housing to mount the turret screw base to the turret housing. Subsequently, the turret screw base remains in a fixed position with respect to the scope body 12 when the elevation turret 22 is rotated. This essentially makes the turret screw base functionally unitary with the scope body, and the turret screw base is not intended to be removed or adjusted by the user. The smooth central bore 508 in the top of the turret housing permits passage of the friction pad 86 and the bottom 42 of the turret screw into the scope body.

Figure 4:
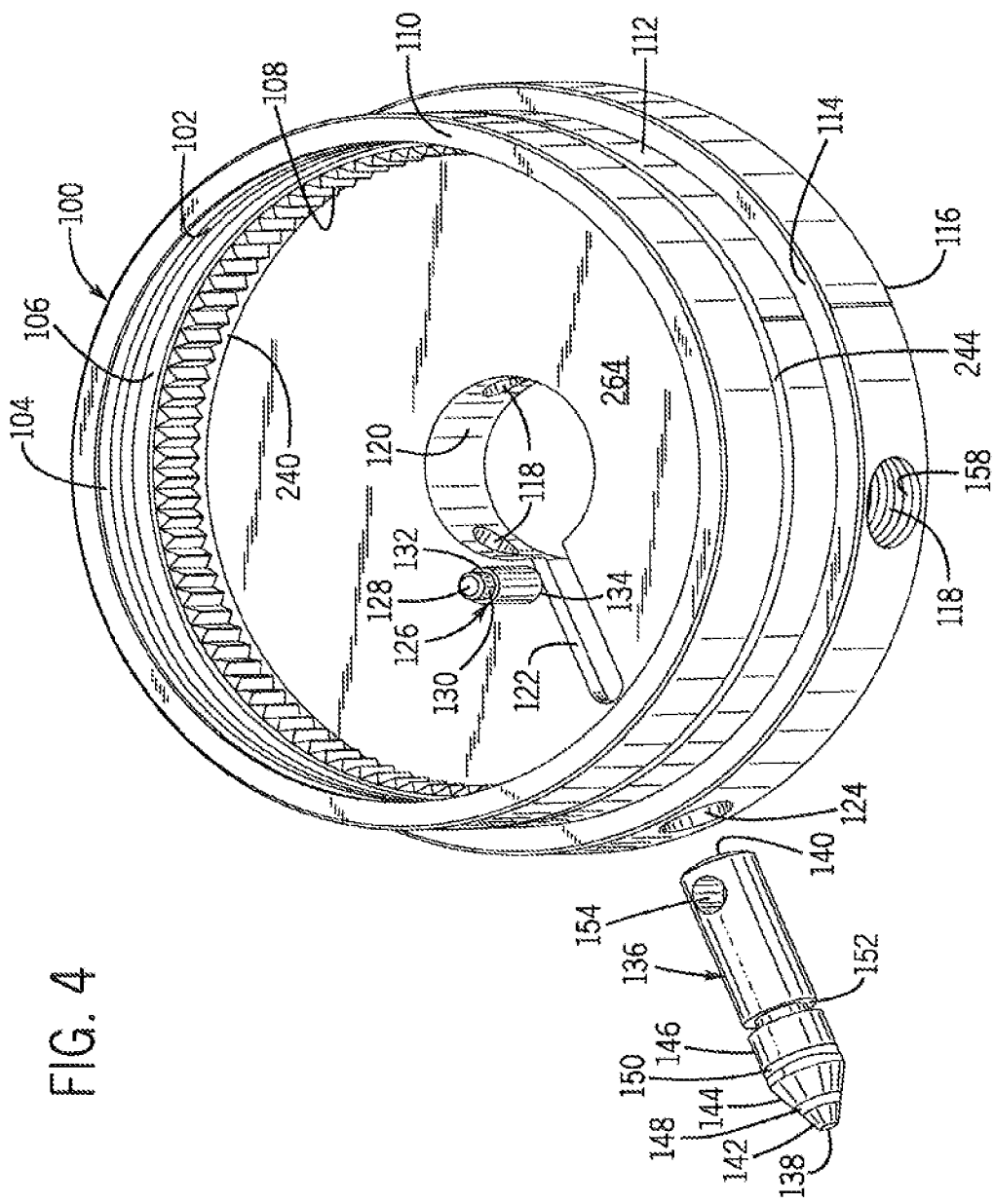
FIG. 4 is a top perspective view of an elevation turret chassis and elevation indicator.

FIG. 4 illustrates the improved elevation turret chassis 100. More particularly, the top 110 of the elevation turret chassis has an interior perimeter 102 with a relief cut 240 adjacent to the floor 264, a toothed surface 108 above the relief cut, a lower click groove 106 above the toothed surface, and an upper click groove 104 above the lower click groove. The relief cut is for the tool that cuts the toothed surface. The floor defines a smooth central bore 120 and a slot 122. The smooth central bore permits passage of the friction pad 86 and the bottom 42 of the turret screw through the turret chassis.

The exterior perimeter 112 of the turret chassis 100 defines an O-ring groove 244. Near the bottom 116 of the turret chassis, the exterior perimeter widens to define a shoulder 114. Three holes 118 with threads 158 communicate from the exterior perimeter through the turret chassis to the smooth bore 120. In one embodiment, the turret chassis is made of steel.

The slot 122 in the floor 264 of the turret chassis 100 communicates with a hole 124 in the exterior perimeter 112 of the turret chassis. The hole 124 receives a rotation indicator, which in this embodiment is an elevation indicator 136. The rear 140 of the elevation indicator defines a cam pin hole 154. The front 138 of the elevation indicator has two stripes 148 and 150 and an O-ring groove 152. The stripe 148 divides a first position 142 from a second position 144. The stripe 150 divides a second position 144 from a third position 146. In one embodiment, the elevation indicator is made of painted black steel, and the stripes are white lines that do not glow, but which could be luminous in an alternative embodiment.

The cam pin hole 154 receives the bottom 134 of a cam pin 126. In one embodiment, the cam pin is a cylindrical body made of steel. The top 128 of the cam pin has a reduced radius portion 130 that defines a shoulder 132. The reduced radius portion of the cam pin protrudes upward through the slot 122 above the floor 264 of the turret chassis 100.

Figure 5A:
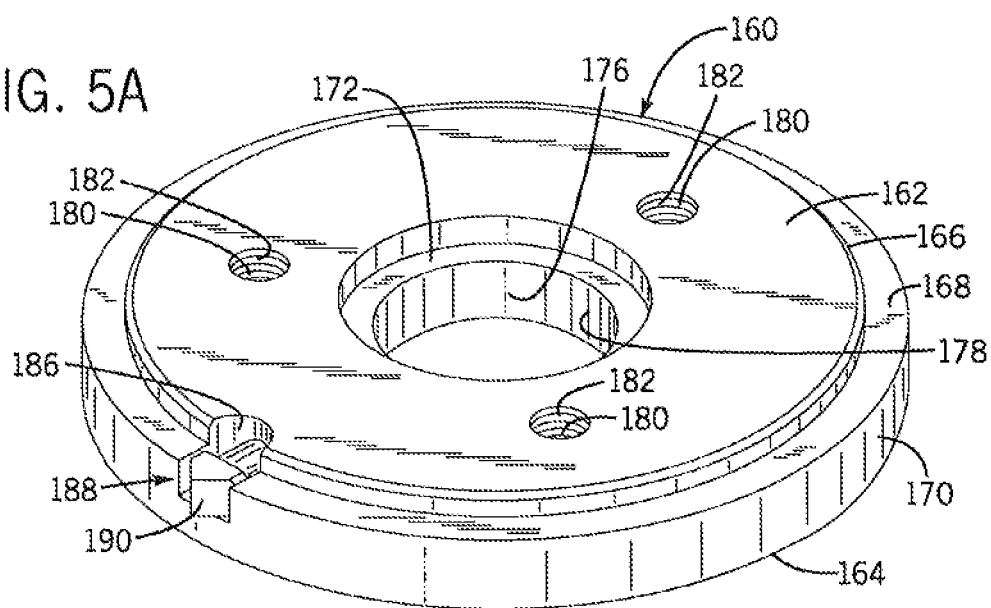
FIG. 5A is a top perspective view of an elevation cam disc.
Figure 5B:
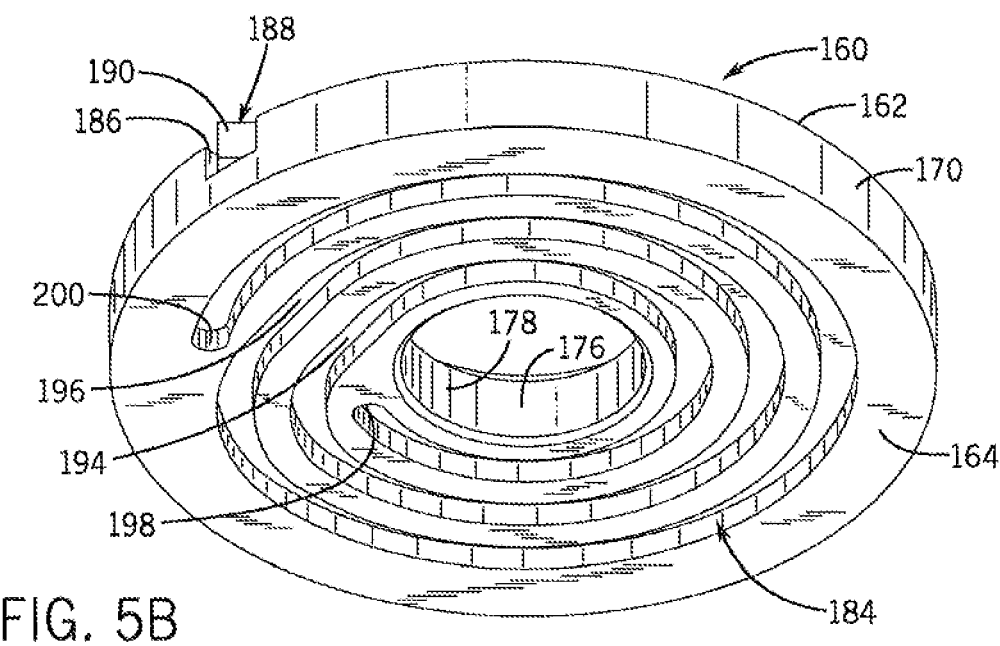
FIG. 5B is a bottom perspective view of the elevation cam disc.

FIGS. 5A and 5B illustrate an improved elevation cam disc 160. More particularly, the elevation cam disc is made of steel with a top face 162 and a bottom face 164. The top has a reduced radius portion 166 that defines a shoulder 168 around the exterior perimeter 170 of the elevation cam disc. The top also defines three mount holes 180 with threads 182. A reduced radius central portion 176 defines a shoulder 172 and a smooth central bore 178. The smooth central bore permits passage of the turret screw subassembly through the elevation cam disc.

A radial clicker channel 186 in the top 162 of the exterior perimeter 170 receives a clicker 188 that reciprocates in the channel, and is biased radially outward. The front, free end 190 of the clicker protrudes from the exterior perimeter. In one embodiment, the clicker has a wedge shape with a vertical vertex parallel to the axis of rotation of the turret and is made of steel.

The bottom 164 of the elevation cam disc 160 is a planar surface perpendicular to the elevation turret rotation axis 26 that defines a recessed spiral channel 184. The spiral channel terminates in a zero stop surface 198 when traveled in a clockwise direction and terminates in an end of travel stop surface 200 when traveled in a counterclockwise direction. When traveled in a counterclockwise direction, the spiral channel defines a first transition 194 and a second transition 196 when the spiral channel begins to overlap itself for the first time and second time, respectively. The spiral channel is adapted to receive the reduced radius portion 130 of the cam pin 126. The spiral channel and the stop surfaces are integral to the elevation cam disc and are not adjustable.

Figure 6:
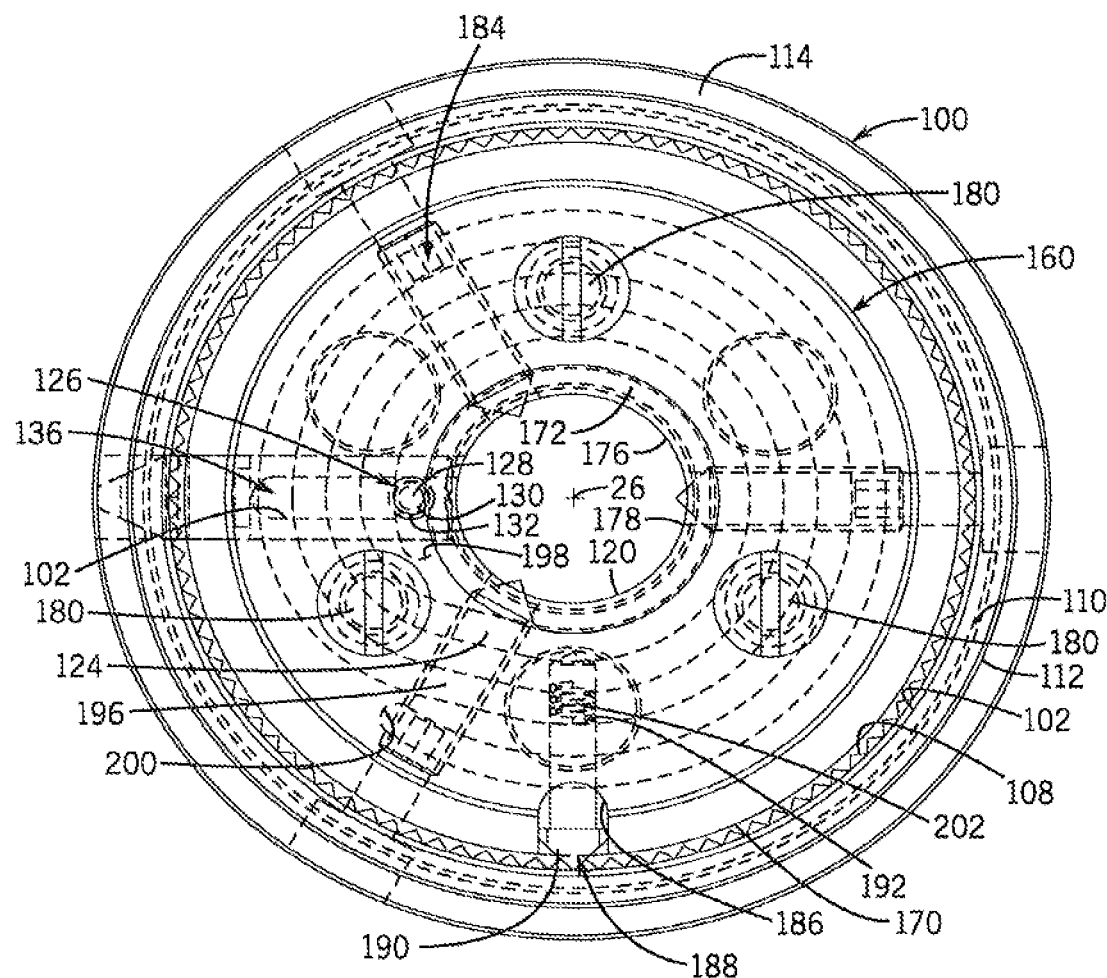
FIG. 6 is a top view of the elevation cam disc inserted into the elevation turret chassis with the elevation cam disc rendered partially transparent.

FIG. 6 illustrates an improved elevation cam disc 160 and improved turret chassis 100. More particularly, the elevation cam disc is shown installed in the turret chassis. The spiral channel 184 receives the reduced radius portion 130 of the cam pin 126. The clicker 188 protrudes from the clicker channel 186 in the exterior perimeter 170 of the elevation cam disc. A spring 202 at the rear 192 of the clicker outwardly biases the clicker such that the clicker is biased to engage with the toothed surface 108 on the interior perimeter 102 of the turret chassis. When the elevation cam disc rotates as the elevation turret 22 is rotated when changing elevation settings, the clicker travels over the toothed surface, thereby providing a rotational, resistant force and making a characteristic clicking sound.

In one embodiment, the toothed surface 108 has 100 teeth, which enables 100 clicks per rotation of the elevation turret 22. The spiral channel 184 is formed of a several arcs of constant radius that are centered on the disc center, and extend nearly to a full circle, and whose ends are joined by transition portions of the channel, so that one end of the inner arc is connected to the end of the next arc, and so on to effectively form a stepped spiral. This provides for the indicator to remain in one position for most of the rotation, and to transition only in a limited portion of turret rotation when a full turret rotation has been substantially completed. In another embodiment, the spiral may be a true spiral with the channel increasing in its radial position in proportion to its rotational position. In the most basic embodiment, the channel has its ends at different radial positions, with the channel extending more than 360 degrees, the ends being radially separated by material, and allowing a full 360 degree circle of rotation with the stop provided at each channel end.

The elevation turret 22 is positioned at the indicium 34 corresponding to 0° of adjustment when the cam pin 126 is flush with the zero stop surface 198. In one embodiment, the spiral channel 184 holds the cam pin 126 in a circular arc segment at a constant distance from the rotation axis 26 until the elevation turret has rotated 9 mrad (324°). The first transition 194 occurs as the elevation turret rotates counterclockwise from 9 mrad (324°) to 10 mrad (360°). During the first transition, the spiral channel shifts the cam pin 126 towards the exterior perimeter 170 so the spiral channel can begin overlapping itself. As the elevation turret continues its counterclockwise rotation, the spiral channel holds the cam pin 126 in a circular arc segment at a constant further distance from the rotation axis 26 until the elevation turret has rotated 19 mrad (684°). The second transition 196 occurs as the elevation turret rotates counterclockwise from 19 mrad (684°) to 20 mrad (7200°). During the second transition, the spiral channel shifts the cam pin 126 even further towards the exterior perimeter 170 so the spiral channel can overlap itself a second time. As the elevation turret continues its counterclockwise rotation, the spiral channel holds the cam pin 126 in a circular arc segment at a constant even further distance from the central bore 178 until the elevation turret has rotated 28.5 mrad (1026°). At that time, the cam pin is flush with the end of travel stop surface 200, and further counterclockwise rotation of the elevation turret and elevation adjustment are prevented. In one embodiment, the first and second transitions are angled at about 36° (10% of the rotation) to enable adequate wall thickness between the concentric circular arc segments about the rotation axis 26 of the spiral channel. The cam pin diameter determines the overall diameter of the turret. Because there are three rotations, any increase in diameter will be multiplied by three in how it affects the overall turret diameter. In the preferred embodiment, a cam pin diameter of 1.5 mm provides adequate strength while remaining small enough to keep the overall diameter of the turret from becoming too large.

Figure 7A:
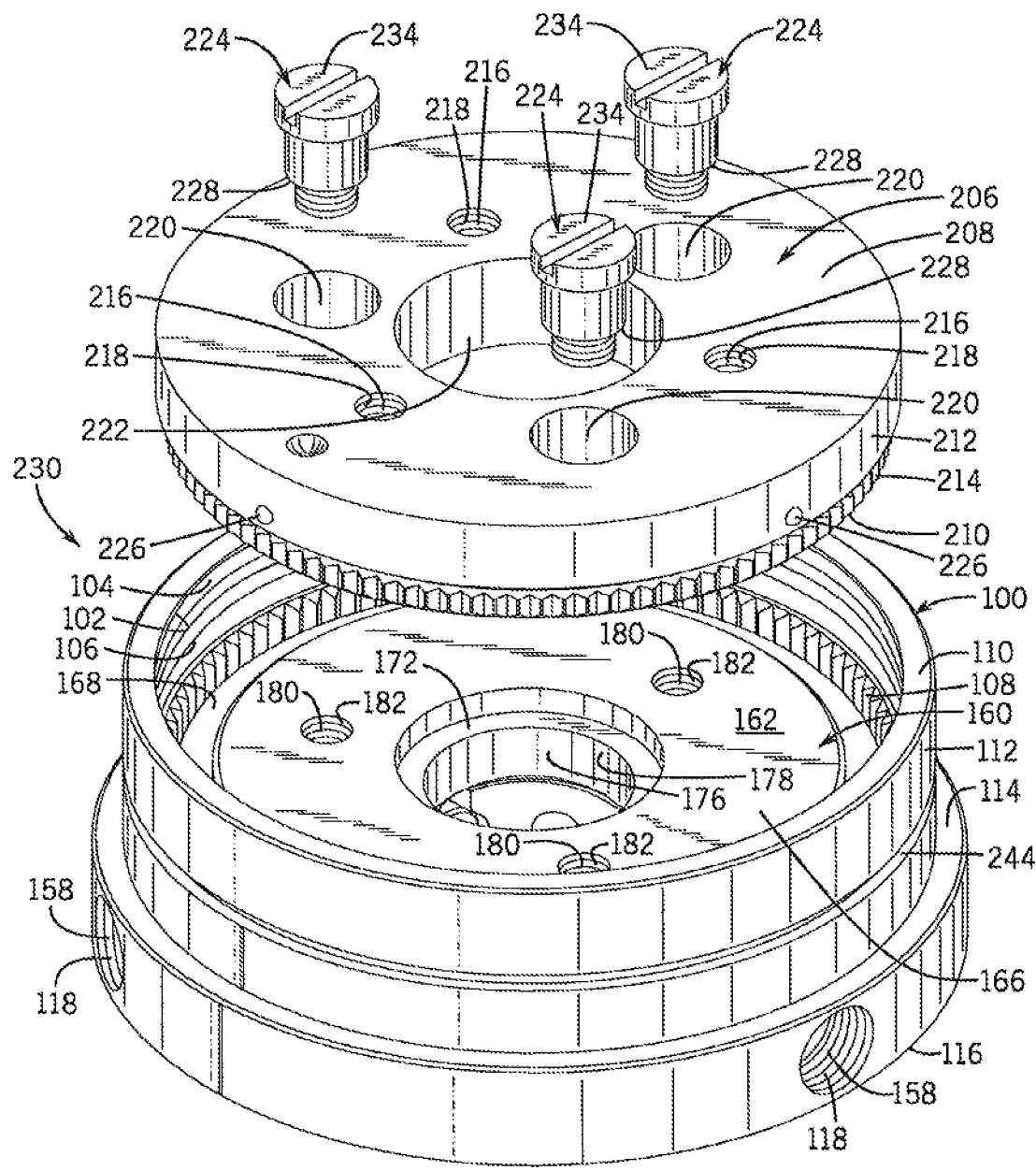
FIG. 7A is a top perspective exploded view of the elevation turret chassis subassembly.
Figure 7B:
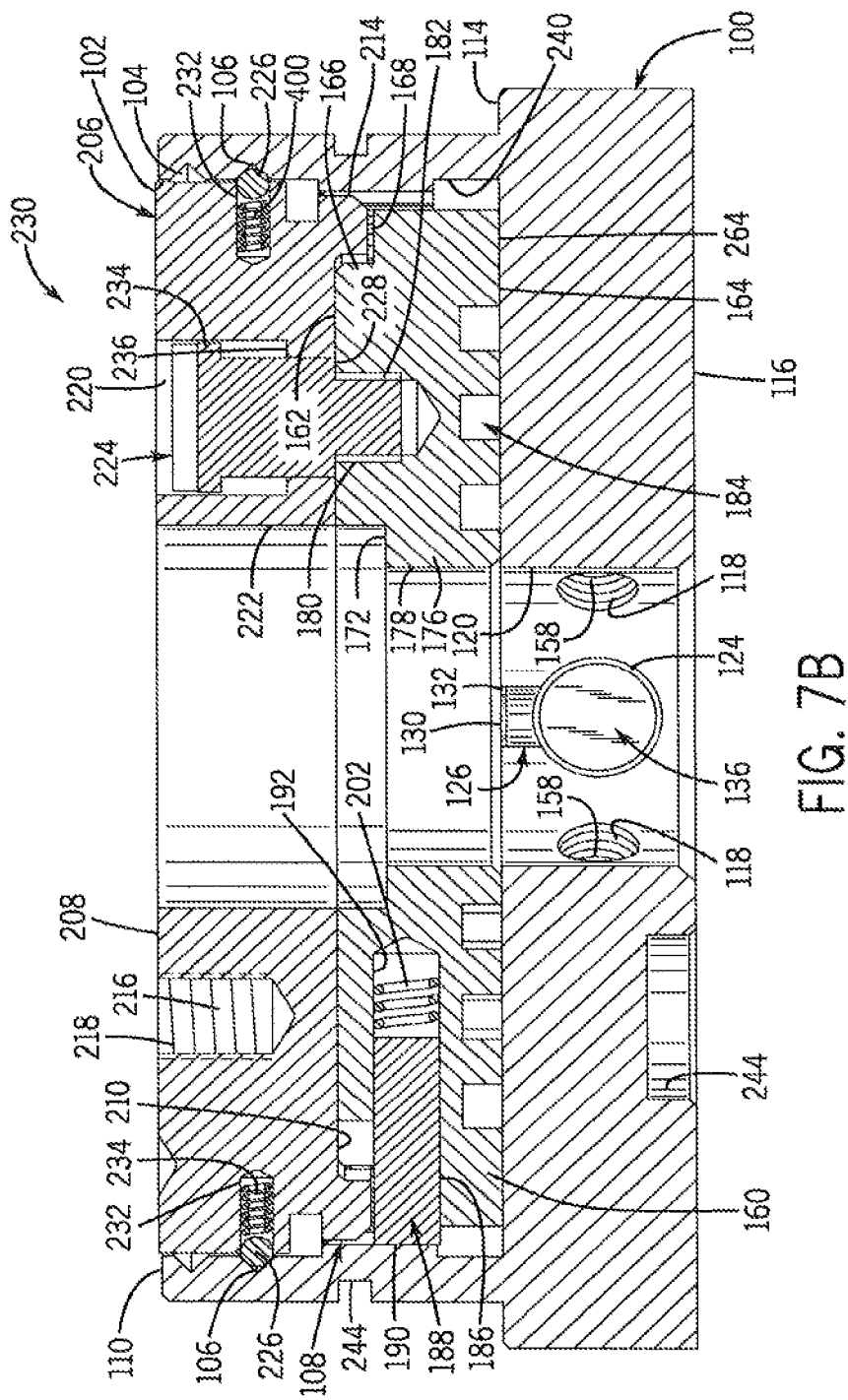
FIG. 7B is a side sectional view of the elevation turret chassis subassembly of FIG. 8A taken along the line 7B-7B.

FIGS. 7A and 7B illustrate an elevation turret chassis subassembly 230. More particularly, the turret chassis subassembly is assembled by inserting a locking gear 206 into the turret chassis 100 on top of the elevation cam disc 160. The elevation turret chassis subassembly is shown in the locked position in FIG. 7B.

The locking gear 206 has a top 208 and a bottom 210. The top 208 defines three mount holes 216 with threads 218. The locking gear also defines three smooth mount holes 220 and a central smooth bore 222. The bottom 210 of the locking gear defines a toothed surface 214. The toothed surface 214 extends downward below the bottom 210 of the locking gear to encircle the reduced radius portion 166 of the top 162 of the elevation cam disc 160 when the turret chassis subassembly is assembled. In one embodiment, the toothed surface 214 has 100 teeth to mesh precisely with the 100 teeth of the toothed surface 108 on the interior perimeter 102 of the turret chassis 100 when the elevation turret 22 is locked.

Four ball bearings 226 protrude outwards from bores 232 in the exterior perimeter 212 located between the toothed surface and the top. Springs 400 behind the ball bearings outwardly bias the ball bearings such that the ball bearings are biased to engage with the upper click groove 104 and lower click groove 106 on the interior perimeter 102 of the turret chassis 100. When the locking gear rises and lowers as the elevation turret 22 is unlocked and locked, the ball bearings travel between the lower and upper click grooves, thereby providing a vertical, resistant force and making a characteristic clicking sound.

When the turret chassis subassembly 230 is assembled, screws 224 are inserted into the mount holes 220 and protrude from the bottom 210 of the locking gear 206. The screws are then screwed into the mount holes 180 in the top 162 of the elevation cam disc 160 to mount the locking gear to the elevation cam disc. Subsequently, the locking gear 206 remains in a fixed rotational position with respect to the elevation cam disc when the elevation turret 22 is unlocked and rotated. The heads 234 of the screws 224 are much thinner than the depth of the mount holes 220 from the top 208 of the locking gear to the shoulders 236. The screws 224 have shoulders 228 that contact the top 162 of the elevation cam disc 160 when the screws are secured. As a result, the locking gear 206 is free to be raised until the heads of the screws contact the shoulders 236 and to be lowered until the bottom of the locking gear contacts the top of the elevation cam disc. This vertical movement is sufficient for the toothed surface 214 of the locking gear to be raised above the toothed surface 108 of the turret chassis 100, thereby enabling the elevation turret to be unlocked and free to rotate.

Figure 8A:
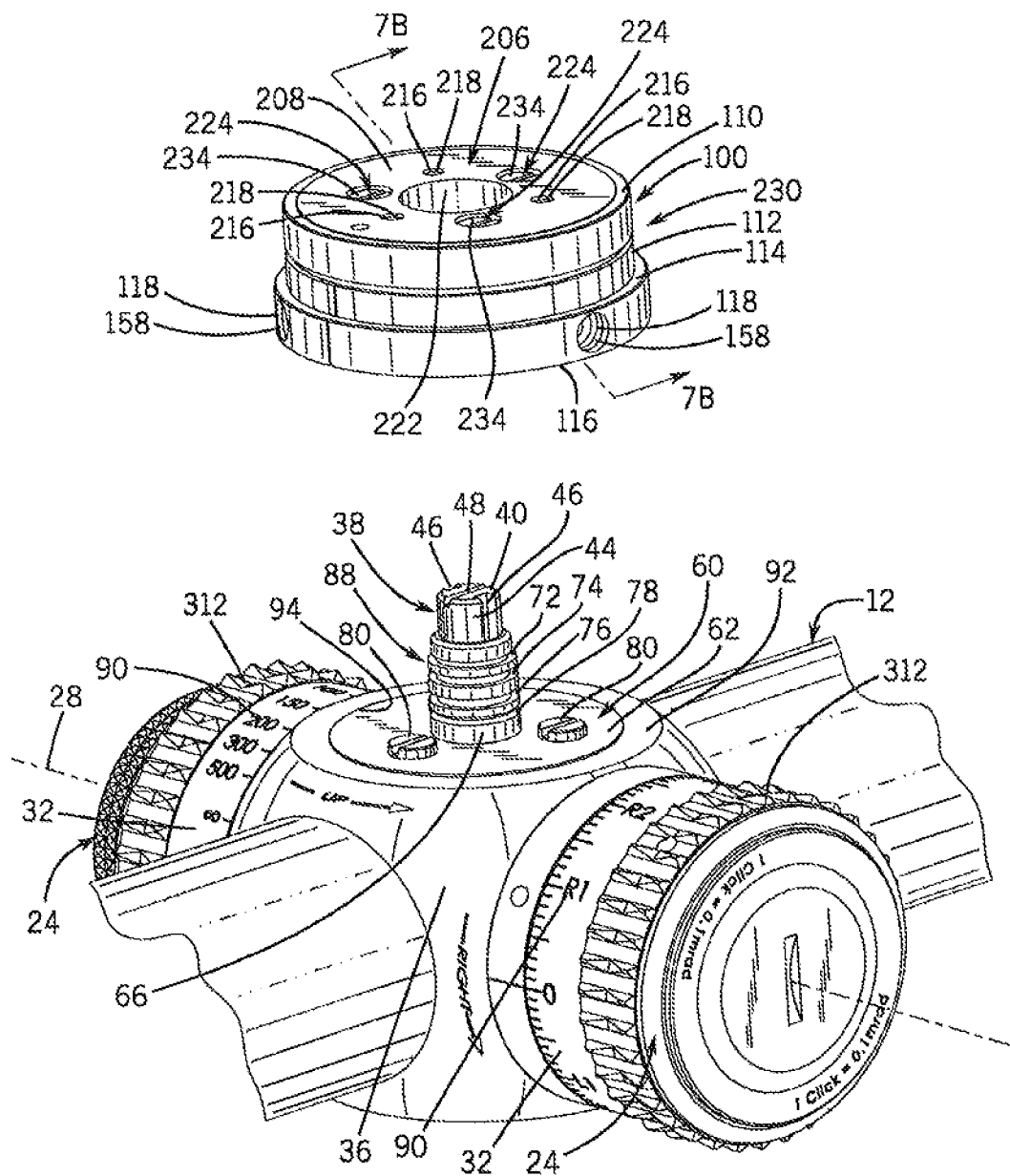
FIG. 8A is a top perspective exploded view of the elevation turret chassis subassembly, elevation turret screw subassembly, and turret housing.
Figure 8B:
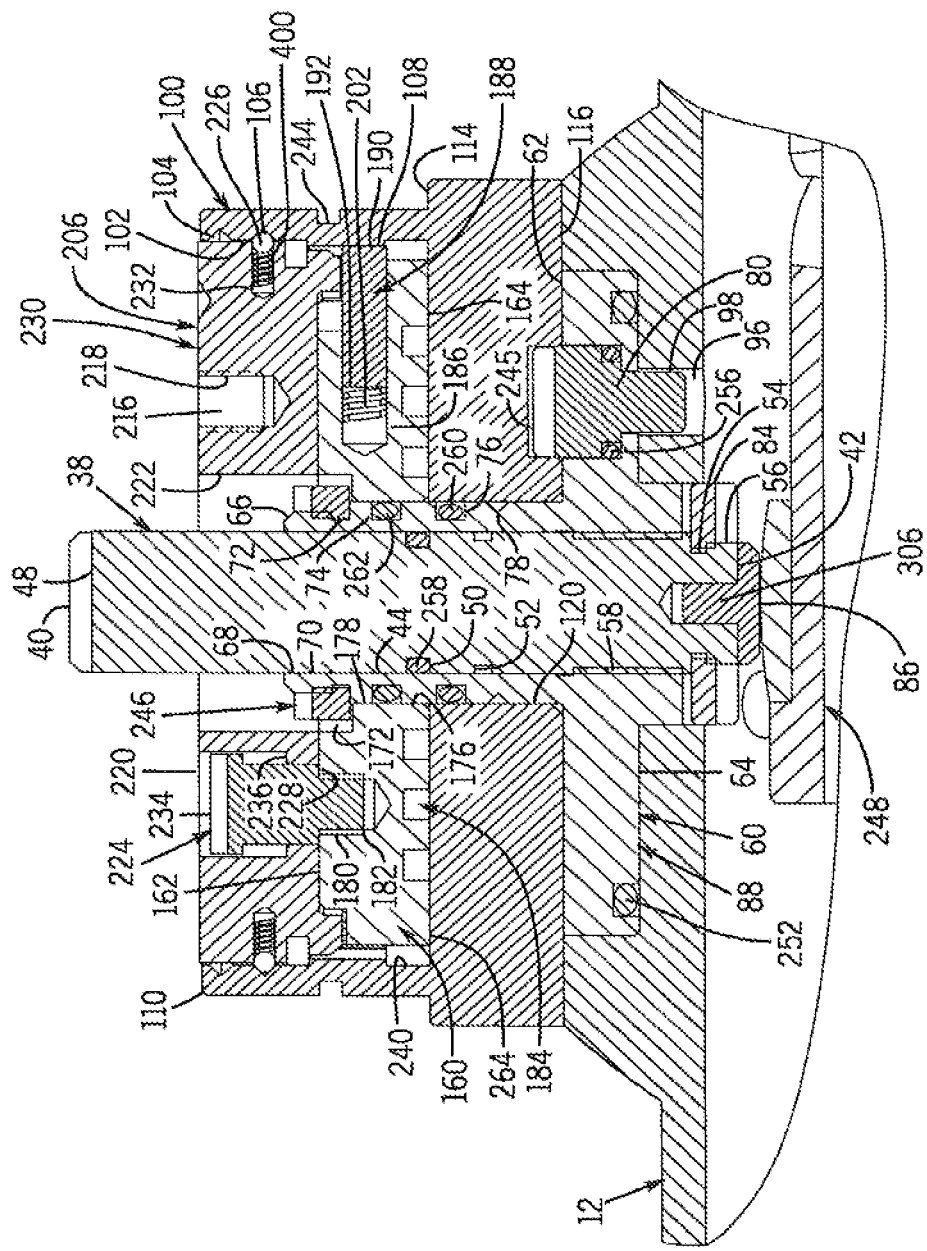
FIG. 8B is a side sectional view of the elevation turret chassis subassembly, elevation turret screw subassembly, and turret housing.

FIGS. 8A and 8B illustrate an elevation turret chassis subassembly 230, turret screw subassembly 88, and turret housing 36. More particularly, the turret chassis subassembly is shown assembled and in the process of being mounted on the turret screw subassembly in FIG. 8A and mounted on the turret screw subassembly in FIG. 8B.

When the elevation turret chassis subassembly 230 is mounted on the turret screw subassembly 88, the top 40 of the turret screw 38 and the collar 66 of the turret screw base 60 pass upwards through the smooth central bore 120 of the turret chassis 100, the smooth central bore 178 of the elevation cam disc 160, and the central smooth bore 222 of the locking gear 206. A retaining ring 246 is received by the ring slot 72 in the collar to prevent the elevation turret chassis subassembly from being lifted off of the turret screw subassembly. Three recesses 245 in the bottom 116 of the turret chassis receive the heads of the screws 80 that protrude from the top 62 of the turret screw base 60 so the bottom 116 of the turret chassis can sit flush against the top 92 of the turret housing 36.

Figure 9A:
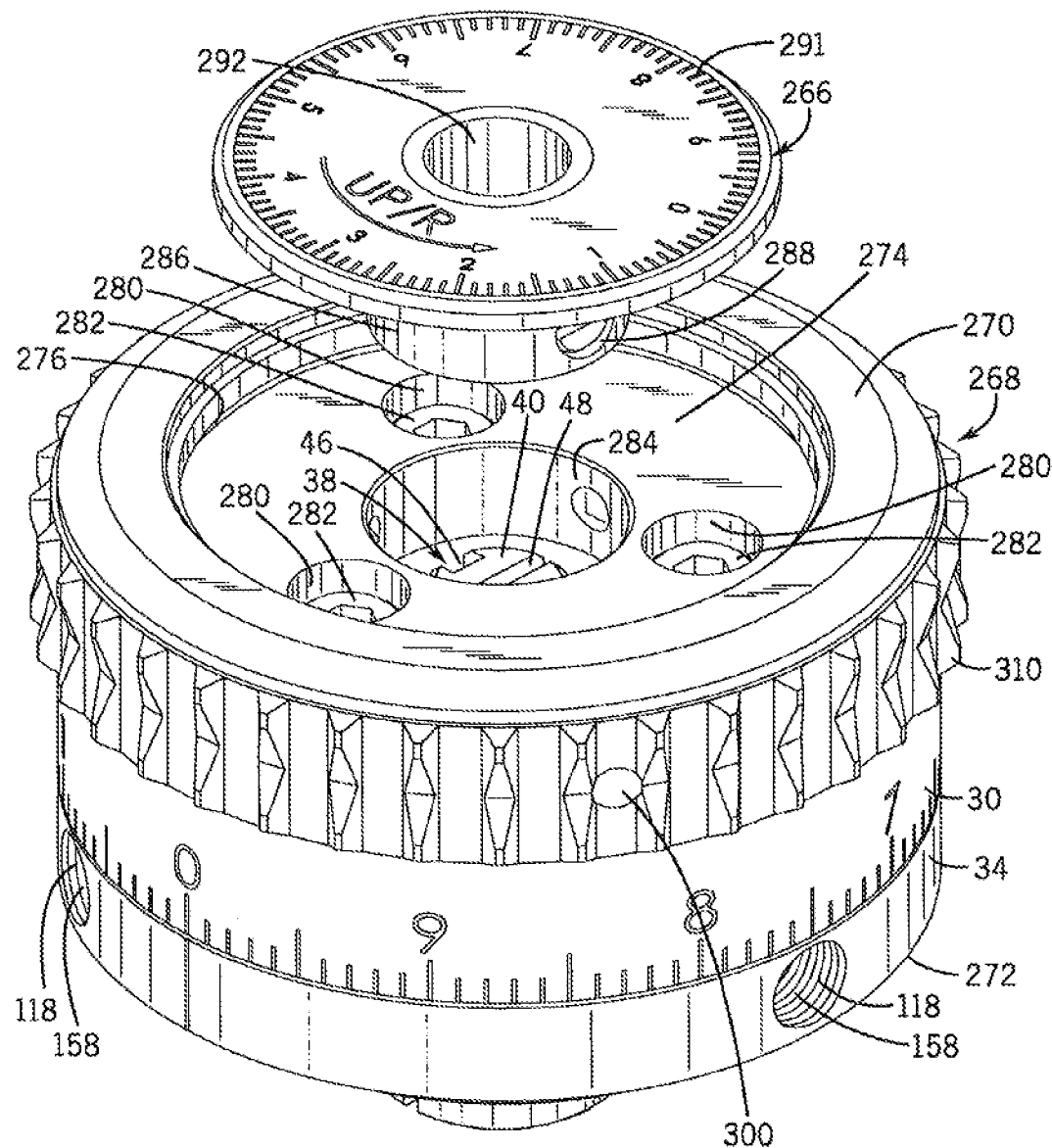
FIG. 9A is a top perspective exploded view of an elevation micro adjuster and elevation outer knob.
Figure 9B:
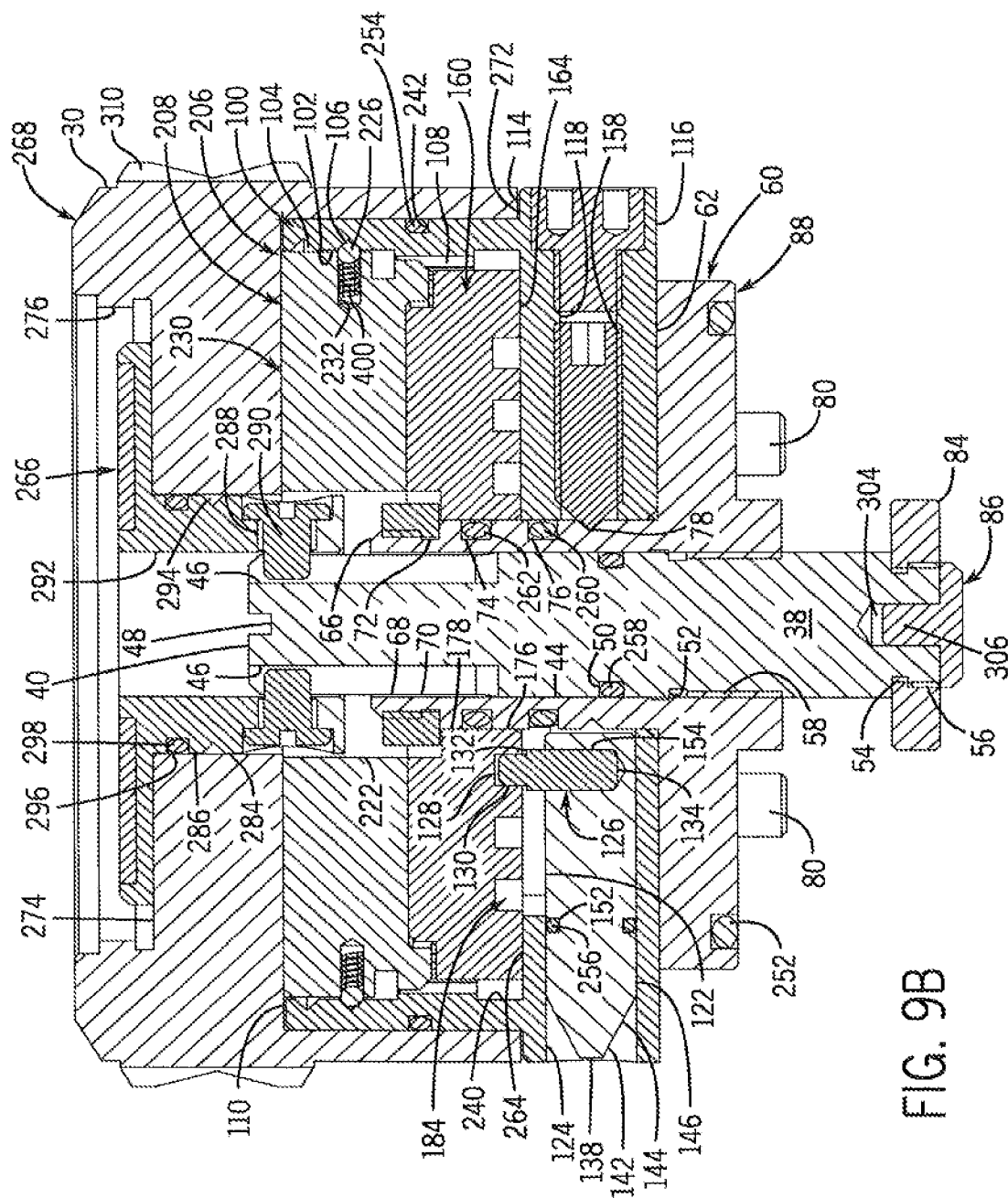
FIG. 9B is a side sectional view of the elevation micro adjuster, elevation outer knob, elevation turret chassis subassembly, and elevation turret screw subassembly of FIG. 1 taken along the line 9B-9B.

FIGS. 9A and 9B illustrate an improved elevation turret 22 with the top cap 308 removed. More particularly, the outer knob 268 is inserted over the top 110 of the turret chassis 100 so that the bottom 272 of the outer knob rests against the shoulder 114 of the turret chassis. The top 270 of the outer knob defines a recess 274 with threads 276. The top of the outer knob also defines three mount holes 280 and a smooth central bore 284. Each of the mount holes 280 receives a screw 282. The screws 282 are screwed into mount holes 216 in the top 208 of the locking gear 206. The perimeter 30 of the outer knob has three holes 300 in the knurled portion 310. The holes 300 communicate with the central bore 284.

The recess 274 of the outer knob 268 receives an elevation micro adjuster 266 when the elevation turret 22 is assembled. The micro adjuster is a disc with a smooth central bore 292 and a downward facing central shaft 286. The shaft defines an O-ring groove 296 immediately below the disc-shaped portion of the micro adjuster. The shaft defines a V-groove 294 immediately below the O-ring groove, and two cam pin holes 288 immediately below the V-groove. Each of the cam pin holes receives a cam pin 290. When the elevation turret 22 is assembled, the shaft 286 is received by the bore 284 in the outer knob 268 and by the bore 222 in the locking gear. The cam pins are received by the cam slots 46 in the turret screw 38.

The micro adjuster 266 is used to provide infinite adjustability of the point of aim instead of limiting the point of aim to coincide with turret click positions. The micro adjuster rotates such that the indicia 291 indicate how much adjustment is being made. A flat blade screwdriver is inserted into the slot 48 on the top 40 of the turret screw 38 to make the adjustment once the outer knob is disengaged from the V-groove 294 in the micro adjuster.

O-rings 298, 508, 252, 260, 262, 258, and 254 seal the elevation turret 22 to protect its components from the elements.

Figure 10:
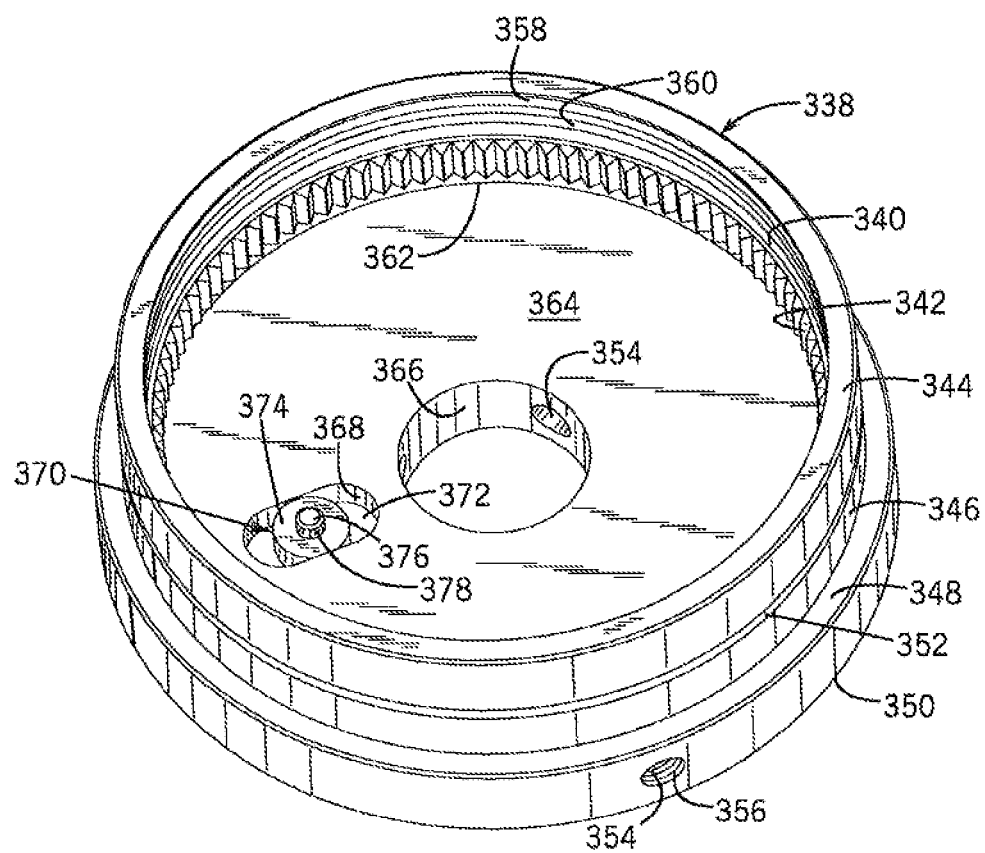
FIG. 10 is a top perspective view of a windage turret chassis.

FIG. 10 illustrates an improved windage turret chassis 338. More particularly, the top 344 of the windage turret chassis has an interior perimeter 340 with a relief cut 362 adjacent to the floor 364, a toothed surface 342 above the relief cut, a lower click groove 360 above the toothed surface, and an upper click groove 358 above the lower click groove. The floor defines a smooth central bore 366 and a slot 368. The smooth central bore permits passage of the friction pad 478 and the bottom 468 of the turret screw 446 through the turret chassis.

The exterior perimeter 346 of the turret chassis 338 defines O-ring groove 352. Near the bottom 350 of the turret chassis, the exterior perimeter widens to define a shoulder 348. Three holes 354 with threads 356 communicate from the exterior perimeter through the turret chassis to the smooth bore 366. In one embodiment, the turret chassis is made of steel.

The slot 368 in the floor 364 of the turret chassis 338 receives the bottom 372 of a cam pin 370. In one embodiment, the cam pin is a cylindrical body made of steel. The top 376 of the cam pin has a reduced radius portion 378 that defines a shoulder 374. The reduced radius portion of the cam pin protrudes upward through the slot 368 above the floor 364 of the turret chassis 338.

Figure 11:
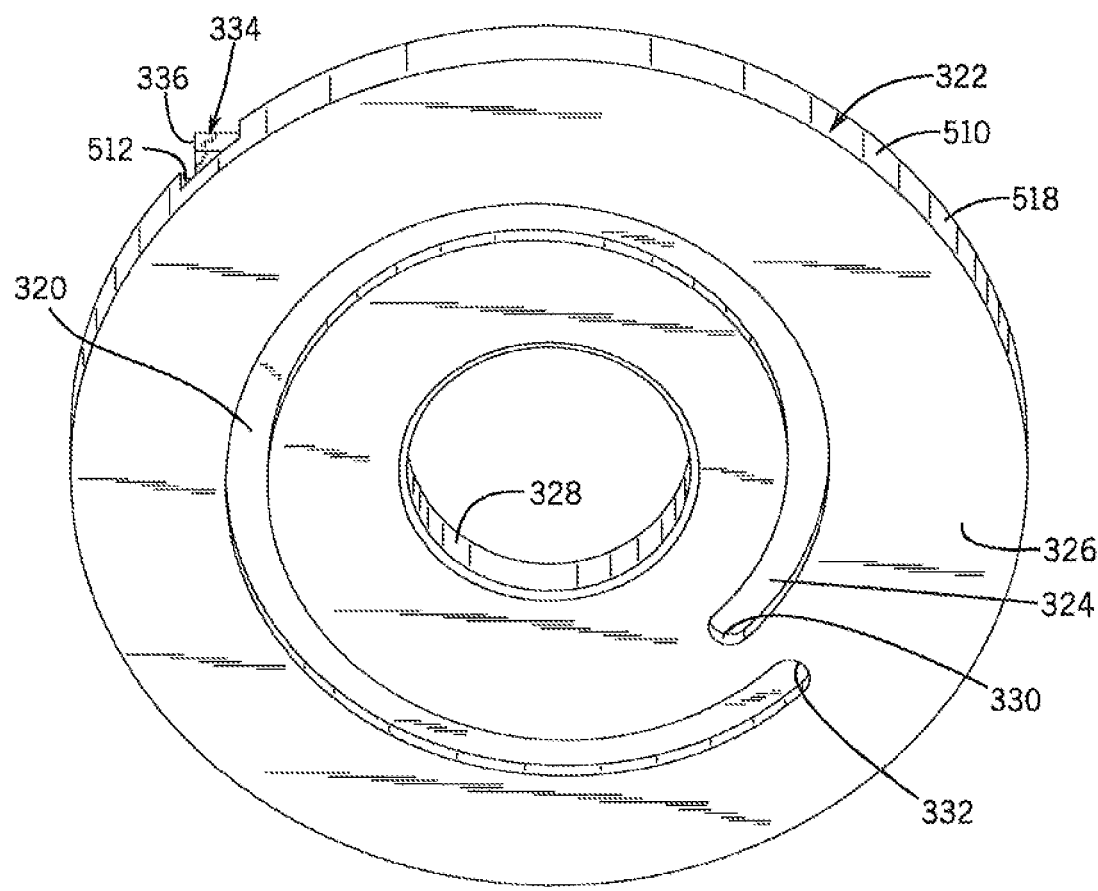
FIG. 11 is a bottom perspective view of the windage cam disc of FIG. 10.

FIG. 11 illustrates an improved windage cam disc 322. More particularly, the windage cam disc is made of steel with a top 510 and a bottom 326. The top has a reduced radius portion 514 that defines a shoulder 516 around the exterior perimeter 518 of the windage cam disc. The top also defines three mount holes 522 with threads 524. A reduced radius central portion 502 defines a shoulder 526 and a smooth central bore 328. The smooth central bore permits passage of the friction pad 478 and the bottom 468 of the turret screw 446 through the windage cam disc.

A clicker channel 512 in the top 510 of the exterior perimeter 518 receives a clicker 334. The front 336 of the clicker protrudes from the exterior perimeter. In one embodiment, the clicker is made of steel.

The bottom 326 of the windage cam disc 322 is a planar surface perpendicular to the windage turret rotation axis 28 that defines a recessed spiral channel 324. The spiral channel terminates in an end of travel stop surface 330 when traveled in a clockwise direction and terminates in an end of travel stop surface 332 when traveled in a counterclockwise direction. When traveled in a counterclockwise direction, the spiral channel gradually moves outwards from the bore 328 so the spiral channel can slightly overlap itself. The spiral channel is adapted to receive the reduced radius portion 130 of the cam pin 126. The spiral channel and the stop surfaces are integral to the windage cam disc and are not adjustable. To provide a full 360° of rotation, the center points of the semi-circular ends of the channel are at the same rotational position on the disc, at different radial distances from the center of the disc. More than 360° of rotation could also be provided as described with respect to the elevation cam disc 160 above.

When the windage cam disc 322 is installed in the turret chassis 338, the spiral channel 324 receives the reduced radius portion 378 of the cam pin 370. The clicker 334 protrudes from the clicker channel 512 in the exterior perimeter 518 of the windage cam disc. A spring 412 at the rear 410 of the clicker outwardly biases the clicker such that the clicker is biased to engage with the toothed surface 342 on the interior perimeter 340 of the turret chassis. When the windage cam disc rotates as the windage turret 24 is rotated when changing windage settings, the clicker travels over the toothed surface, thereby providing a rotational, resistant force and making a characteristic clicking sound.

In one embodiment, the toothed surface 342 has 100 teeth, which enables 100 clicks per rotation of the windage turret 24. The windage turret 24 is positioned at the indicium 90 corresponding to 0° of adjustment when the cam pin 370 is located at the midpoint 320 of the spiral channel 324. The spiral channel holds the cam pin 126 in an arc segment at a constantly increasing distance from the rotation axis 28. The spiral channel 324 permits one-half of a revolution either clockwise or counterclockwise from the zero point 320, which is 5 mrad in one embodiment. At that time, the cam pin is flush with an end of travel stop surface, and further rotation of the windage turret and windage adjustment are prevented. The spiral channel 324 could be reconfigured to allow various other mrads of travel from the zero point 320.

Figure 12:
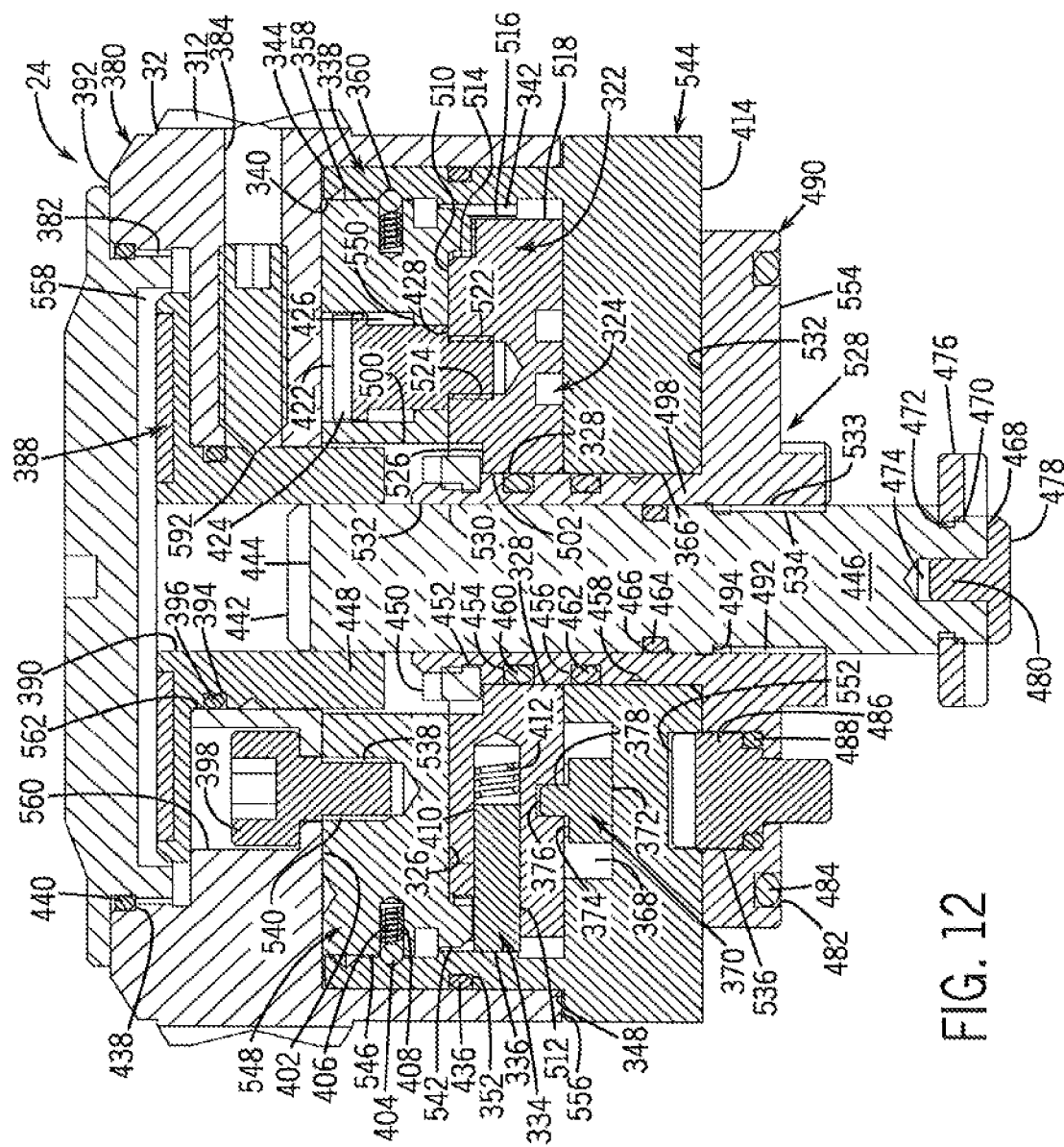
FIG. 12 is a side sectional view of the windage turret of FIG. 3 taken along the line 12-12.

FIG. 12 illustrates an improved windage turret 24. More particularly, the windage turret 24 is substantially identical in construction to the elevation turret 22 except for changes to the spiral cam disc and elimination of the elevation indicator. Although the windage turret could similarly include a windage indicator and spiral cam disc with more than one revolution, in practice, one revolution of the turret has been sufficient to adjust for lateral sighting adjustments.

The turret screw subassembly 528 consists of a turret screw 446, a turret screw base 490, a friction pad 478, and various fasteners. The turret screw is a cylindrical body made of brass in one embodiment. The top 442 of the turret screw defines a slot 444, and two opposing cam slots run from the top part way down the side 530. Two O-ring grooves 464 and 494 are on the side located below the cam slots. The bottom 468 of the turret screw has a reduced radius portion 470 that defines a ring slot 472. The ring slot 472 receives a retaining ring 476, and the bottom 468 receives the shaft 480 of the friction pad 478 in a bore 474. The side of the turret screw immediately below the O-ring groove 494 and above the ring slot 472 is a threaded portion 492. In one embodiment, the slot 444 is shaped to receive a straight blade screwdriver.

The turret screw base 490 is a disc-shaped body made of steel in one embodiment. A cylindrical collar 498 rises from the center of the top 532 of the turret screw base. The collar has a turret screw bore 533 with threads 534. The exterior of the collar defines a set screw V-groove 458 above the top of the turret screw base, an O-ring groove 456 above the set screw V-groove, an O-ring groove 454 above the O-ring groove 456, and a ring slot 452 above the O-ring groove 456. The turret screw base has three mount holes 536 with smooth sides and a shoulder that receive screws 486.

The threads 534 of the turret screw bore 533 are fine such that the turret screw bore may receive the threads 492 on the turret screw 446. The retaining ring 476 limits upward travel of the turret screw so that the turret screw cannot be inadvertently removed from the turret screw bore.

A locking gear 548 is inserted into the turret chassis 338 on top of the windage cam disc 322. The windage turret 24 is shown in the locked position in FIG. 12. The locking gear has a top 402 and a bottom 326. The top 402 defines three mount holes 538 with threads 540. The locking gear also defines three smooth mount holes 426 and a central smooth bore 500. The bottom 326 of the locking gear defines a toothed surface 542. The toothed surface 542 extends downward below the bottom 326 of the locking gear to encircle the reduced radius portion 514 of the top 510 of the windage cam disc 322 when the turret chassis subassembly 544 is assembled. In one embodiment, the toothed surface 542 has 100 teeth to mesh precisely with the 100 teeth of the toothed surface 342 on the interior perimeter 340 of the turret chassis 338 when the windage turret 24 is locked.

Four ball bearings 404 protrude outward from bores 408 in the exterior perimeter 546 located between the toothed surface and the top. Springs 406 behind the ball bearings outwardly bias the ball bearings such that the ball bearings are biased to engage with the upper click groove 358 and lower click groove 360 on the interior perimeter 340 of the turret chassis 338. When the locking gear rises and lowers as the windage turret 24 is unlocked and locked, the ball bearings travel between the lower and upper click grooves, thereby providing a perpendicular, resistant force with respect to the optical axis 256 and making a characteristic clicking sound.

When the turret chassis subassembly 544 is assembled, screws 422 are inserted into the mount holes 426 and protrude from the bottom 326 of the locking gear 548. The screws are then screwed into the mount holes 522 in the top 510 of the windage cam disc 322 to mount the locking gear to the windage cam disc. Subsequently, the locking gear remains in a fixed rotational position with respect to the windage cam disc when the windage turret 24 is unlocked and rotated. The heads 424 of the screws 422 are much thinner than the depth of the mount holes 426 from the top 402 of the locking gear to the shoulders 550. The screws 422 have shoulders 428 that contact the top 510 of the windage cam disc 322 when the screws are secured. As a result, the locking gear is free to be raised until the heads of the screws contact the shoulders 550 and to be lowered until the bottom of the locking gear contacts the top of the windage cam disc. This vertical movement is sufficient for the toothed surface 542 of the locking gear to be raised above the toothed surface 342 of the turret chassis 338, thereby enabling the windage turret to be unlocked and free to rotate.

When the windage turret chassis subassembly 544 is mounted on the turret screw subassembly 528, the top 442 of the turret screw 446 and the collar 498 of the turret screw base 490 pass upwards through the smooth central bore 366 of the turret chassis 338, the smooth central bore 328 of the windage cam disc 322, and the smooth central bore 500 of the locking gear 548. A retaining ring 450 is received by the ring slot 452 in the collar to prevent the windage turret chassis subassembly from being lifted off of the turret screw subassembly. Three recesses 552 in the bottom 414 of the turret chassis receive the heads of the screws 486 that protrude from the top 532 of the turret screw base 490 so the bottom 414 of the turret chassis can sit flush against the top of the turret housing 36. O-rings 488 seal the screws 486 within mount holes 536. An O-ring groove 482 in the bottom 554 of the turret screw base receives an O-ring 484 to seal the bottom of the turret screw base against the top of the turret housing 36.

The outer knob 380 is inserted over the top 344 of the turret chassis 338 so that the bottom 556 of the outer knob rests against the shoulder 348 of the turret chassis. The top 392 of the outer knob defines a recess 558 with threads 382. The top of the outer knob also defines three mount holes 560 and a smooth central bore 562. Each of the mount holes 560 receives a screw 398. The screws 398 are screwed into mount holes 538 in the top 402 of the locking gear 548. The perimeter 32 of the outer knob has three holes 384 in the knurled portion 312. The holes 384 communicate with the central bore 562.

The recess 558 of the outer knob 380 receives an windage micro adjuster 388 when the windage turret 24 is assembled. The micro adjuster is a disc with a smooth central bore 390 and a downward facing central shaft 448. The shaft defines an O-ring groove 394 immediately below the disc-shaped portion of the micro adjuster. The shaft defines a V-groove 592 immediately below the O-ring groove, and two cam pin holes, similar to the pin hole 288 seen in FIG. 9B, immediately below the V-groove. Each of the cam pin holes receives a cam pin, similar to the cam pin 290 seen in FIG. 9B. When the windage turret 24 is assembled, the shaft 448 is received by the bore 562 in the outer knob 380 and by the bore 500 in the locking gear. The cam pins are received by the cam slots in the turret screw 446.

The micro adjuster 388 is used to provide infinite adjustability of the point of aim instead of limiting the point of aim to coincide with turret click positions. Indicia on the micro adjuster rotate to indicate how much adjustment is being made. A flat blade screwdriver is inserted into the slot 444 on the top 442 of the turret screw 446 to make the adjustment once the outer knob is disengaged from the V-groove 592 in the micro adjuster.

O-rings 440, 396, 460, 462, 466, 436, 484 and 488 seal the windage turret 24 to protect its components from the elements.

FIGS. 13-15B illustrate an improved rifle scope turret with spiral-cam mechanism 10. More particularly, the rifle scope 10 is shown in use. FIGS. 14A and 14B show the elevation turret 22 in the locked and unlocked positions, respectively. The elevation turret is unlocked by raising it parallel to the rotation axis 26. This upward motion disengages the toothed surface 214 of the locking gear 206 from the toothed surface 108 of the turret chassis 100. The elevation turret is then free to rotate to the extent permitted by the spiral channel 184 in the elevation cam disc 160. Lowering the elevation turret engages the toothed surface of the locking gear 206 with the toothed surface 108 of the turret chassis. This downward motion returns the elevation turret to the locked position.

When "0" on the outer knob 268 is facing the user, the cam pin 126 is resting against the zero stop surface 198, which prevents any further downward adjustment of the turret screw 38. Zero on the outer knob is the distance the rifle scope 10 is sighted in at when no clicks have been dialed in on the elevation turret and references the flight of the projectile. If the rifle scope is sighted in at 200 yards, it is said to have a 200 yard zero.

Figure 13:
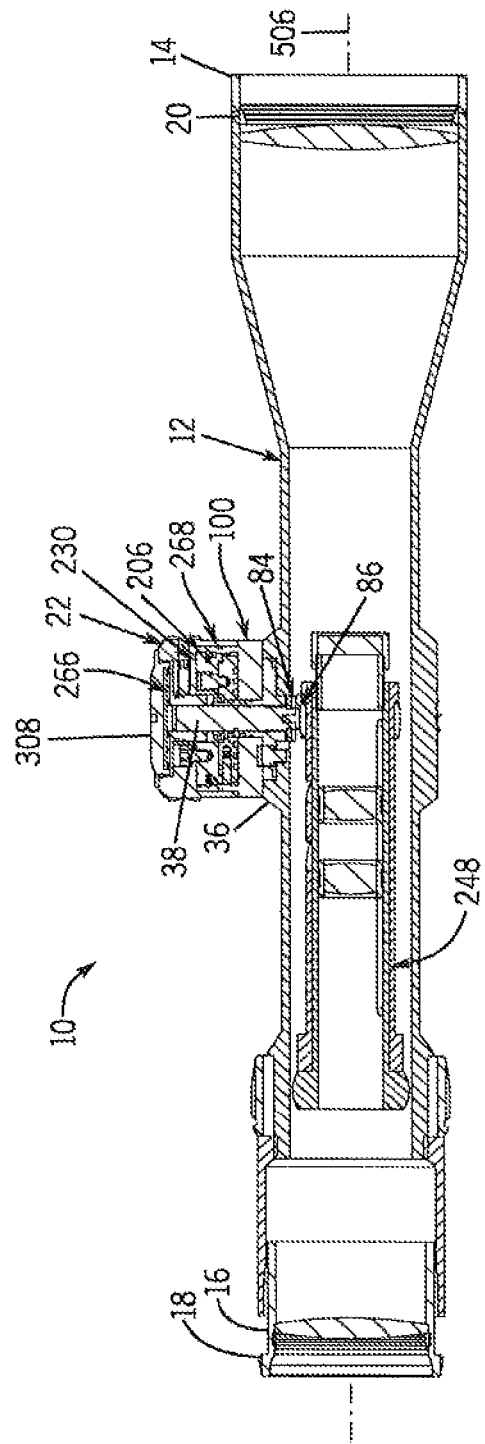
FIG. 13 is a side sectional view of the rifle scope with adjustment stops of FIG. 1 taken along the line 13-13.
Figure 14A:
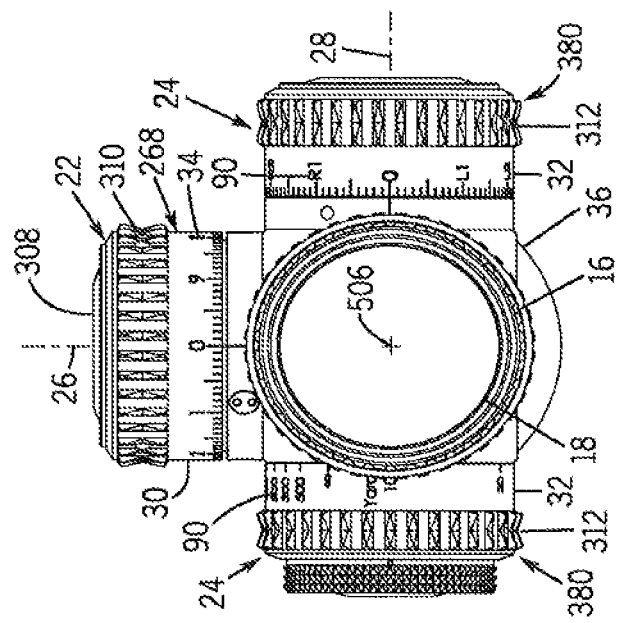
FIG. 14A is a rear view of the rifle scope with adjustment stops of FIG. 1 with the elevation turret in the locked position.
Figure 14B:
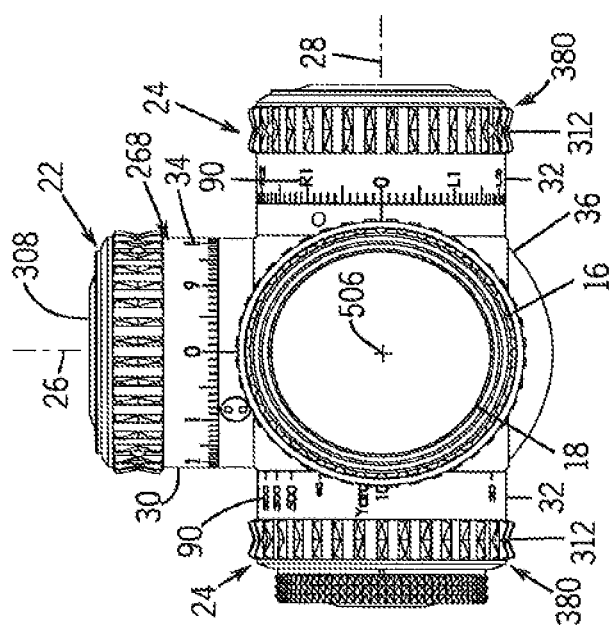
FIG. 14B is a rear view of the rifle scope with adjustment stops of FIG. 1 with the elevation turret in the unlocked position.

When the elevation turret 22 is unlocked, the user rotates the elevation turret counterclockwise for longer range shots than the sight-in distance of the rifle scope 10. Rotation of the turret adjusts the amount of the turret screw 38 that extends from the bottom of the turret. As is shown in FIG. 13, the turret applies a downward force in the form of elevation pressure to the moveable optical element 248 via the friction pad 86. The windage turret 24 applies a sideways force in the form of windage pressure to the movable optical element via the friction pad 478. These forces are balanced by a biasing spring pressure applied to the moveable optical element by a biasing spring at an angle of about 135.degree. with respect to both the elevation pressure and the windage pressure.

Figure 15B:
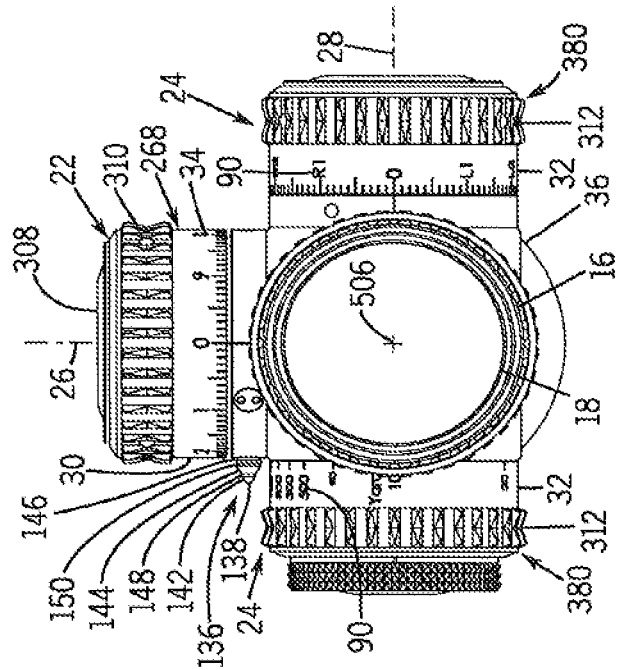
FIG. 15B is a rear view of the rifle scope with adjustment stops of FIG. 1 with the elevation turret having made two rotations.
Figure 15A:
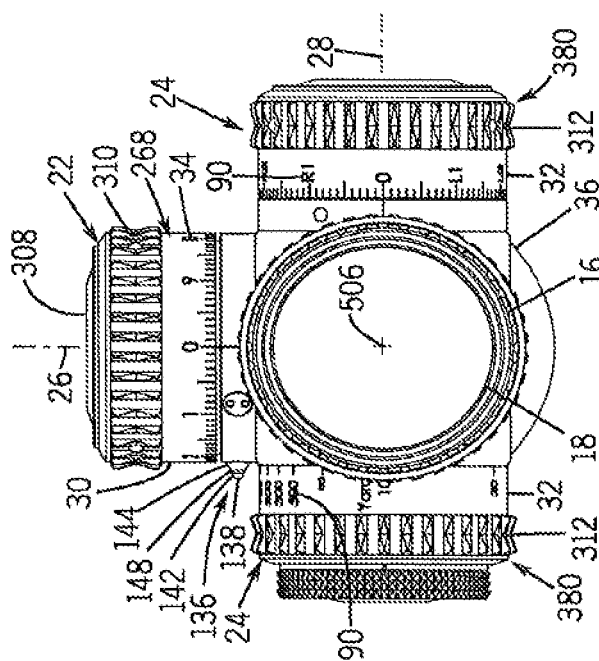
FIG. 15A is a rear view of the rifle scope with adjustment stops of FIG. 1 with the elevation turret having made one rotation.

Once a full revolution is made on the elevation turret 22, the elevation indicator 136 pops out from hole 124 in the exterior perimeter 112 of the turret chassis 100. The position of the elevation indicator after one revolution is shown in FIG. 15A, in which the first position 142, stripe 148, and second position 144 are visible. After a second revolution is made on the elevation turret, the elevation indicator extends further outwards radially as shown in FIG. 15B, in which the stripe 150 and a portion of the third position 146 are newly visible. When the user dials the turret back down by rotating the turret clockwise, the indicator retracts back into the turret chassis. As a result, the indicator provides both visual and tactile indication to the user of which of the nearly three revolutions the elevation turret is on.

The windage turret functions substantially identically to the elevation turret except for lacking an elevation indicator. Although the windage turret could similarly include a windage indicator, in practice, one revolution of the turret has been sufficient to adjust for lateral sighting adjustments.

Figure 16:
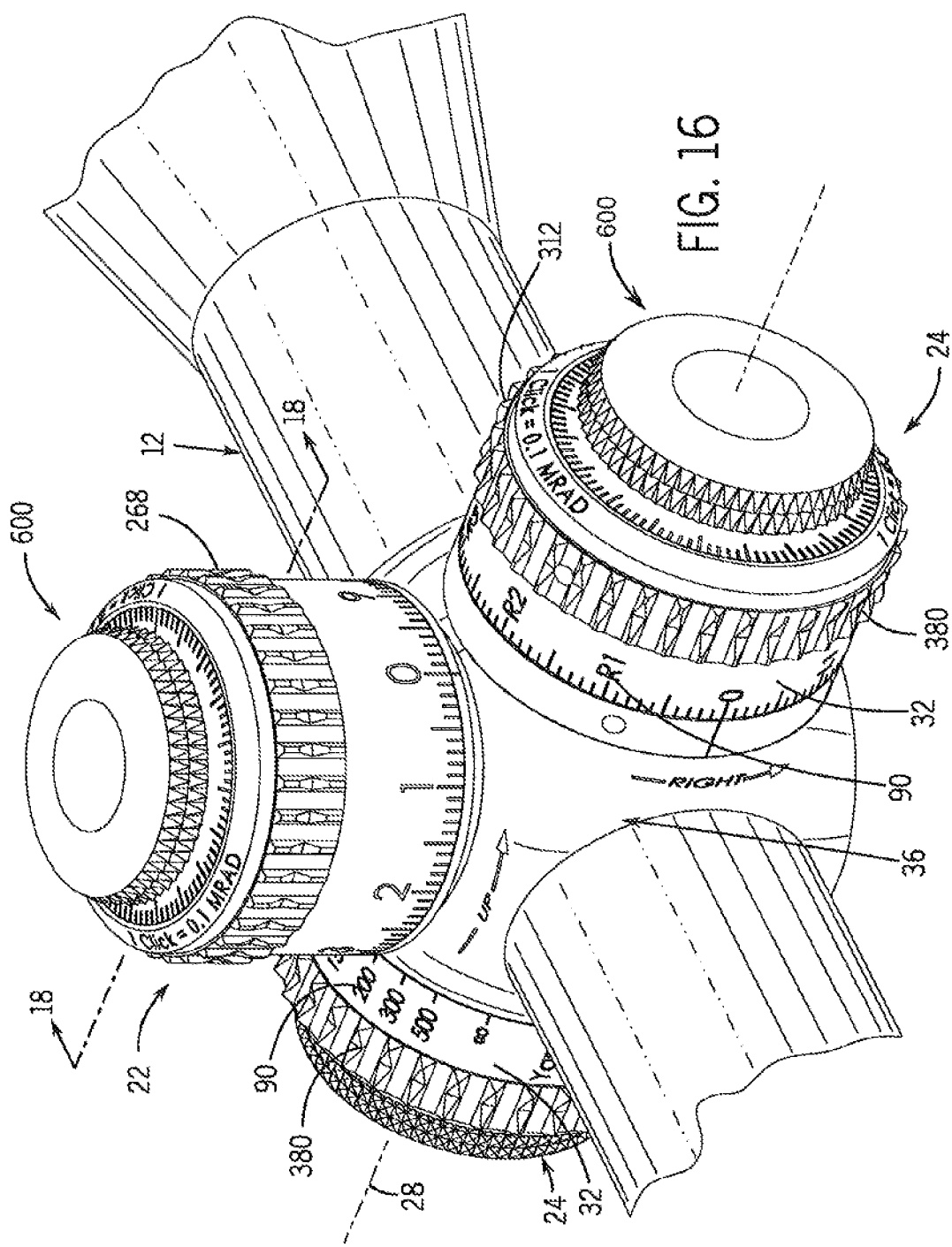
FIG. 16 is an isometric view of an alternative embodiment of an optic device with multiple knob turrets.
Figures 24, 25:
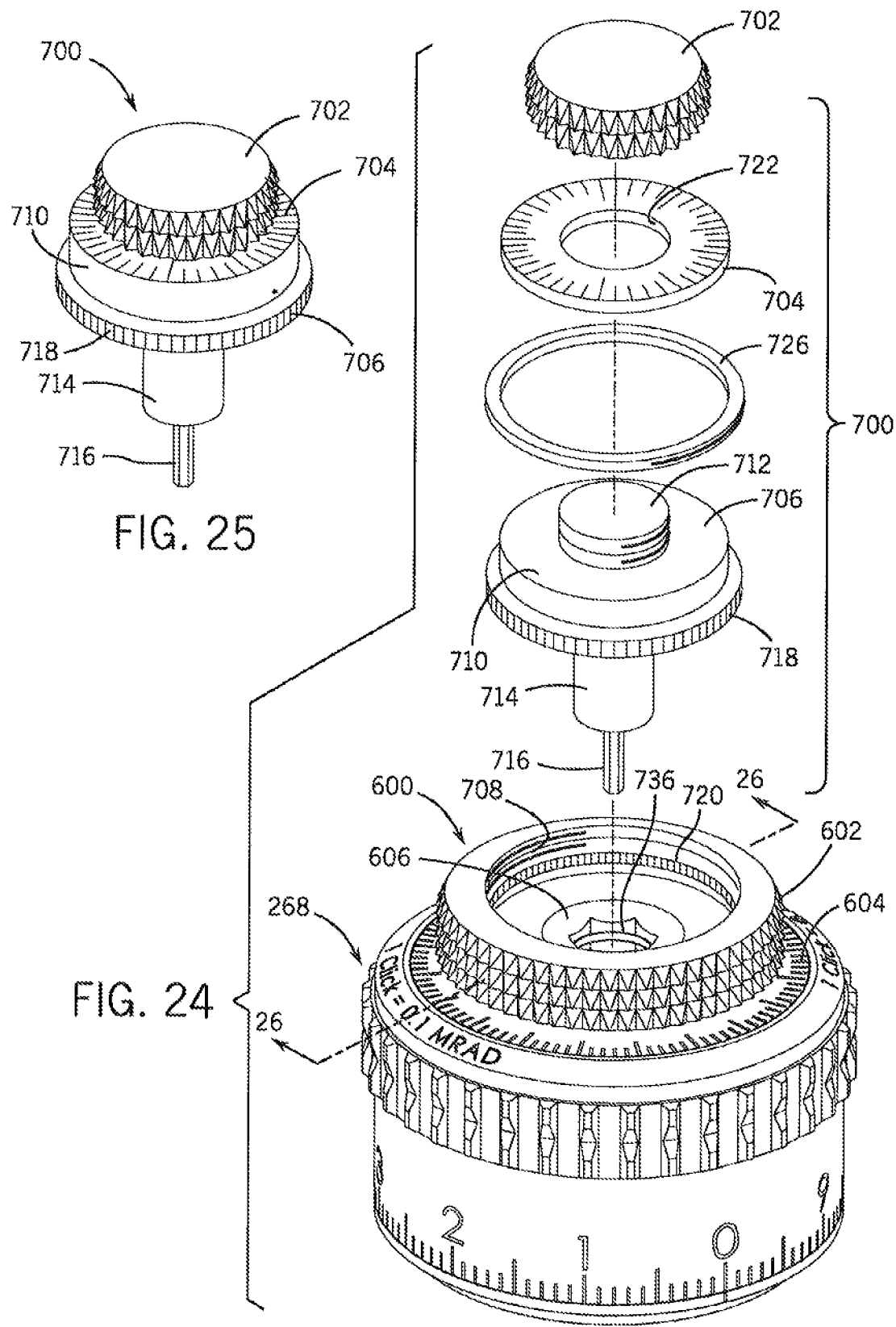
FIG. 24 is an exploded view of another alternate embodiment of a multiple knob turret.
FIG. 25 is a perspective view of another alternate embodiment of a second top knob turret.

In another embodiment, a plurality of knobs is provided on a turret. At least one knob, such as top knob 600, in addition to the outer knob can be located on the windage turret the elevation turret or both. The embodiment illustrated in FIG. 16 shows a top knob 600 on each of the windage and elevation turrets, but more than two top knobs can be utilized as seen in FIG. 24, for example first top knob 600 and second top knob 700. In the embodiment illustrated in FIG. 17, the top knob 600 includes a dial 602, a display 604 and a top locking gear 606.

Figure 18:
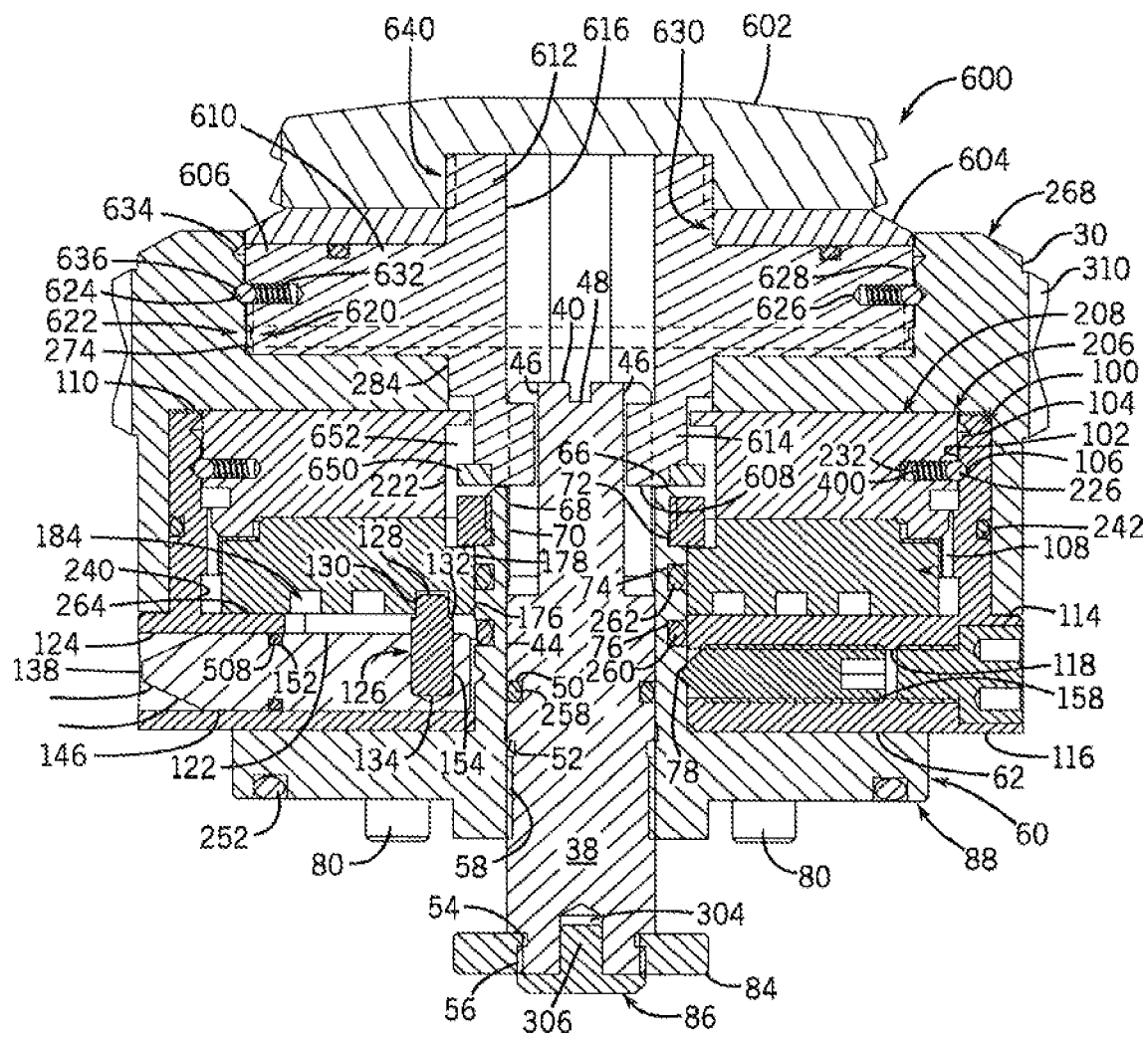
FIG. 18 is a cross-sectional view of the multiple knob turret of FIG. 16 taken along the line 18-18.
Figure 19:
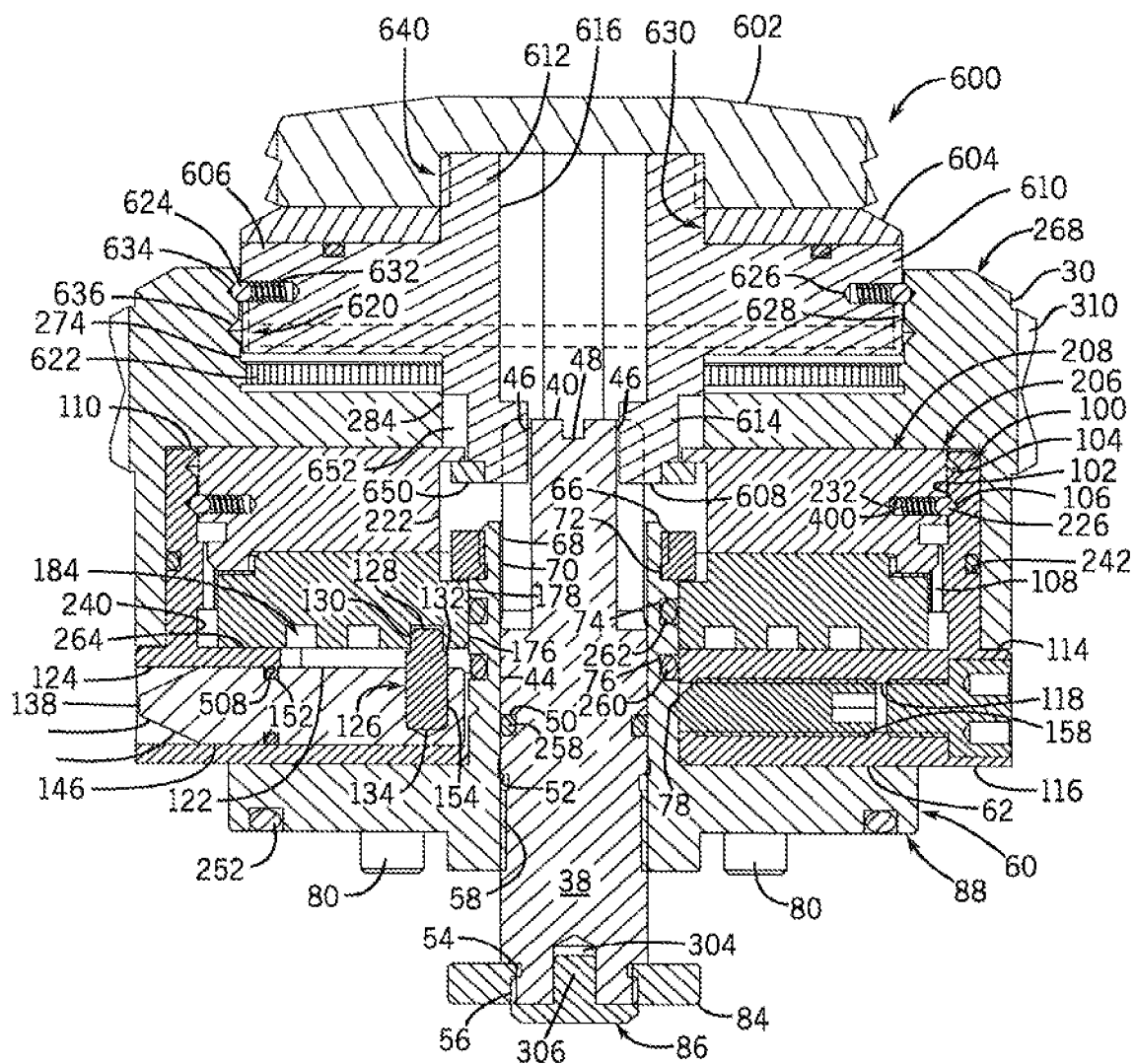
FIG. 19 is a cross-sectional view of the multiple knob turret of FIG. 18 with the top knob in a raised position.
Figure 20:
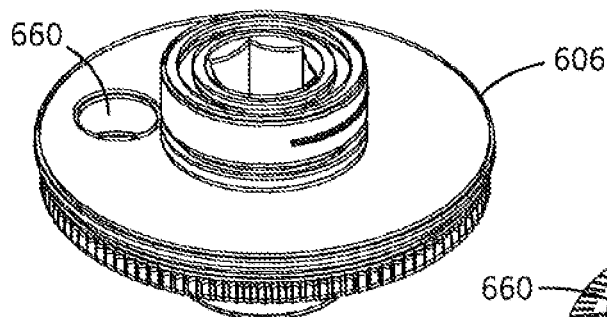
FIG. 20 is an isometric view of an alternate embodiment of a top locking gear.

As seen in FIG. 18, the top locking gear 606 has a shoulder 610 that separates an upper hollow post 612 from a lower hollow post 614. The upper and lower hollow posts 612, 614 are connected via a central bore 616. The exterior of the lower hollow post 614 is shaped and sized to fit within the central bores 178, 222, 284. The interior of the lower hollow post 614 is shaped and sized to snuggly fit around the top of the turret screw 38 such that when the top locking gear 606 is rotated, the turret screw 38 is rotated. For example, as seen in FIGS. 18-19, the interior of the lower hollow post 614 has projections 608 that fit within the cam slots 46 in the turret screw 38.

The bottom of the exterior of the lower hollow post 614 can be threaded to engage a threaded lock washer 650. The threaded lock washer 650 resides in a wide grooved portion 652 of the central bore 284 of the outer knob 268. The wide grooved portion 652 allows the lock washer 650 to ride up and down, but limits the lock washer's range of motion. Thus when the top knob 600 is lifted up to its raised or unlocked position, the top end of the wide grooved portion 652 stops the lock washer 652 and thus prevents the top knob from being withdrawn from the turret completely.

At the outer edge or exterior perimeter of the shoulder 610 is a toothed surface 620. In one embodiment, the toothed surface 620 has a first plurality of 100 teeth to mesh precisely with a second plurality of 100 teeth of the toothed surface 622 on the recess 274 of the outer knob 268 when the top knob is in its lower or locked position as is seen in FIG. 18. When the top locking gear 606 is in its lower position, the interaction between the toothed surfaces 620, 622 prevents the top locking gear from rotating. When the top locking gear 606 is in its raised position, as seen in FIG. 19, the toothed surface 620 is no longer engaged with the toothed surface 622 allowing the top locking gear to rotate, thereby rotating the screw 38 which moves the movable optical element 248. The raising and lowering of the top knob 600 provides a another means of adjusting the screw 38 and thereby the optical element 248, in addition to the outer knob 268, without the use of tools. In the embodiment shown in FIGS. 18-19, the top knob 600 is smaller in diameter than the outer knob 268. In order to move the screw 38 the same amount of degrees, the outer perimeter 30 of the outer knob 268 needs to travel a greater distance than the outer perimeter of the top knob 600.

In one embodiment, the screw 38 is connected to a spiral cam mechanism 10 as discussed above. Thus, when the screw 38 is rotated, such as by rotating the first top knob 600, the amount the first top knob can be rotated is limited by the zero stop surface 198 and the end of travel stop surface 200. Optionally, the rotation indicator 136 will also change in response to the rotation of the first top knob 600, thereby indicating the amount of rotation.

Other methods of creating rotation limits are known in the industry and the use of which are included within the scope of the invention. One example of a rotation limit, in addition to the zero stop(s) and stop surfaces described above, is described in U.S. Pat. No. 8,397,420, which is owned by the Applicant and is hereby incorporated by reference herein in its entirety for all purposes. For example, when the screw 38 is rotated, such as by rotating the first top knob 600, the amount the first top knob can be rotated could be limited by the stop surface 66 at the end of track 60 as described in U.S. Pat. No. 8,397,420.

In the embodiment shown in FIGS. 18-19, rotation of the top knob 600 does not directly cause rotation of the outer knob 268. However, if desirable, the top knob 600 could be engaged with the outer knob 268 such that the rotation of the top knob 600 directly causes rotation of the outer knob 268.

The top of the shoulder 610 provides a seat for the display 604. The exterior of the upper hollow post 612 and the central bore 630 of the display 604 could be threaded such that the display is screwed or placed onto the upper hollow post 612 until it is seated on the shoulder 610. The central bore 630 of the display 604 could also be smooth and slid onto the upper hollow post 612. The dial 602 has a threaded bore 640, which screws onto the threaded upper hollow post 612 to sandwich and thereby releasably retain the display 604 together with the top locking gear 606. The dial 602 also allows the display 604 to be changed without the use of tools.

Four ball bearings 624 protrude outwards from bores 626 in the exterior perimeter 628 of the top locking gear 606 located between the toothed surface 620 and the top of the shoulder 610. Springs 632 behind the ball bearings 624 outwardly bias the ball bearings such that the ball bearings engage with the upper click groove 634 and lower click groove 636 on the recess 274 of the outer knob 268. When the top locking gear 606 rises and lowers as the top knob 600 is unlocked and locked, the ball bearings 624 travel between the lower and upper click grooves 636, 634, thereby providing a vertical, resistant force and making a characteristic clicking sound.

Because the display 604 can be removed from the top knob 600, by unscrewing the dial and sliding the display off of the upper hollow post 612, if not threaded, or unscrewed, if threaded, the display can be conveniently and quickly replaced with another display without the use of tools. For example, a hunter may have a display with indicia of scale to adjust for the drag for a particular bullet or projectile. While hunting, the hunter may desire to use a different bullet and thus may need a display with indicia of scale to adjust for the drag of that particular bullet. The hunter may unscrew and remove the dial, remove the first display and replace it with a second display, thereafter replacing the dial. Thus, the top knob 600 provides a means for adjusting the movable optical element for any number of scales, in the example provided a first scale for the drag of a first projectile and a second scale for the different drag of a second projectile. Similarly, one could switch between a display for internal and external conditions such as bullet drop, bullet path, altitude, temperature, wind drift, pressure, humidity, spin drift, altitude, gravity, latitude, coriolis effect, etc. Further, using the top knob with an indicia of scale smaller than the indicia 34 on the outer knob 268 allows a shooter to sight in a gun at a specific range without having to use tools to remove the outer knob and/or top cap 308 and adjust the turret screw 38 with, for example, a flat blade screwdriver as described above. The combination of a top knob and outer knob provides a first and second means for adjusting the movable optical element for a first scale, for example by using the outer knob, and a second scale, for example by using the top knob.

During assembly of the turret, the top knob 600 is inserted into the outer knob 268 before the outer knob is inserted over the top 110 of the turret chassis 100 as described with respect to FIGS. 9A and 9B. The lock washer 650 is inserted into the wide grooved portion 652 of the outer knob 268 and held in position. The top knob 600 is inserted into the outer knob 268 such that the threaded portion of the lower hollow post 614 engages the threaded lock washer 650. While preventing the lock washer 650 from spinning, the top knob 600 can be screwed into the lock washer 650. Then the screws 282 can be inserted through the holes 660 in the shoulder 610 of the top locking gear 606 into the mount holes 280 of the outer knob 268. The screws 282 can then be screwed into mount holes 216 in the top 208 of the locking gear 206 as described with respect to FIGS. 9A and 9B.

Figure 17:
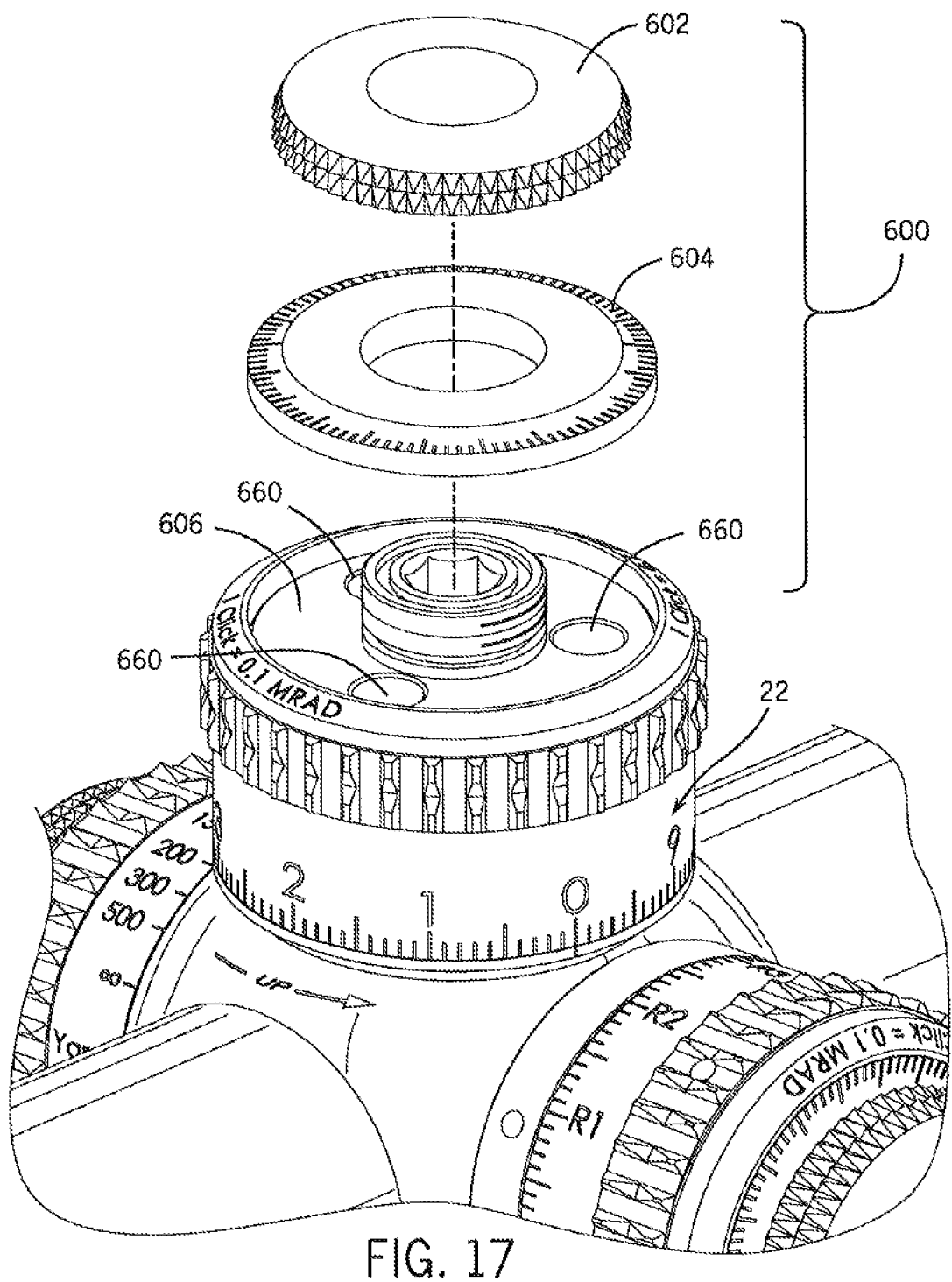
FIG. 17 is an exploded view of a multiple knob turret of FIG. 16.

Although the embodiment illustrated in FIG. 17 shows three holes 660 in the shoulder 610 of the top locking gear 606, any number of holes could be used to provide access for the screws 282. For example, in FIGS. 20-23 only one hole 660 is included in the shoulder 610 of the top locking gear 606. To assemble, the top locking gear 606 is rotated such that the single hole 660 is lined up with one of the mount holes 280 and a screw 282 is threaded. Then the top locking gear 606 is rotated such that the single hole 660 is lined up with a second one of the mount holes 280 and another screw 282 inserted. This process is continued until all the screws 282 have been threaded.

Figure 21:
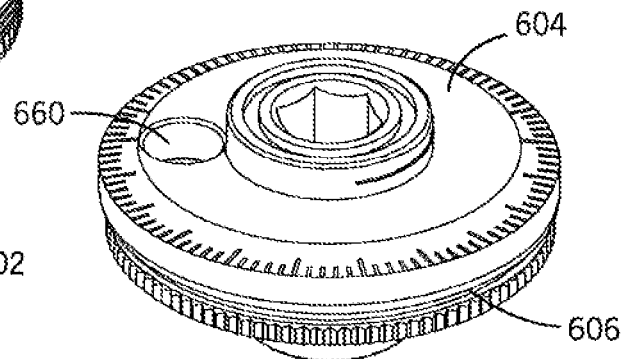
FIG. 21 is an isometric view of an alternate embodiment of a top locking gear and display.
Figure 22:
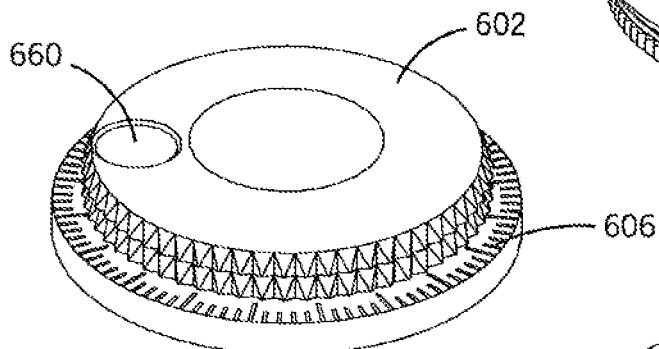
FIG. 22 is an isometric view of an alternate embodiment of a dial and display.
Figure 23:
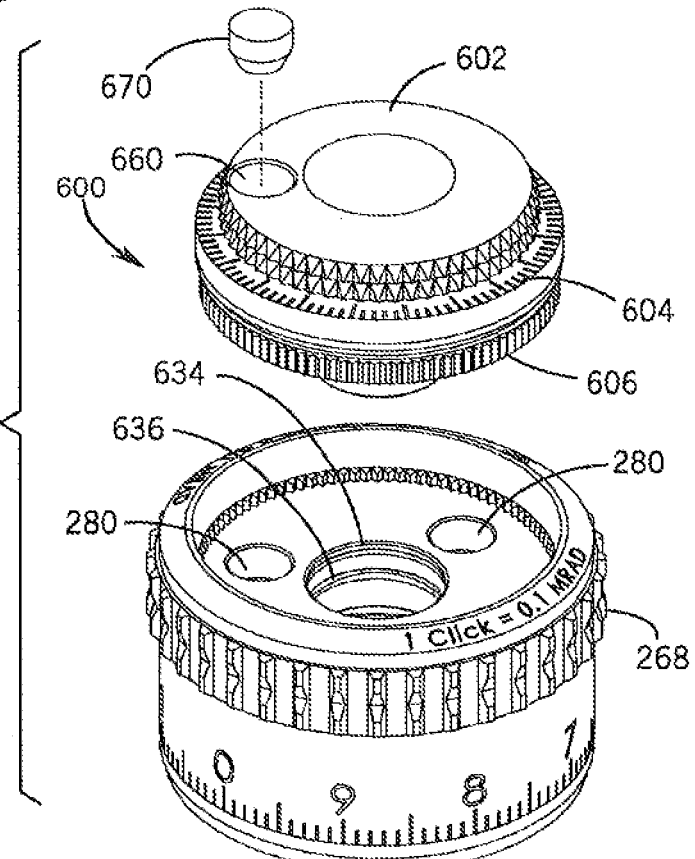
FIG. 23 is an exploded view of another alternate embodiment of a multiple knob turret.

The top knob 600 could have more or less components than described above. For example, as seen in FIG. 21, the display 604 and top locking gear 606 could be a unitary structure. In FIG. 23, the entire top knob 600 is one unitary structure. The embodiment shown in FIG. 23 also discloses a removable plug 670 that can be inserted into the hole 660 to prevent water, dirt or debris from entering the internal components of the turret through the hole. In FIG. 22, the display 604 and dial 602 are one unitary structure. Such a top knob 600 could be manufactured from a single piece of material or by joining a number of components to make a single top knob structure as seen in FIGS. 21-23.

A turret may have one or more top knobs. In the embodiment seen in FIG. 24, the turret has a first top knob 600 and a second top knob 700. The second top knob 700 could be one unitary structure as seen in FIG. 25 or separate components that create a second top knob 700 as seen in FIG. 24. The second top knob 700 of FIG. 24 includes a separate second dial 702, a second display 704 and a second top locking gear 706. Like the top knob 600 described above, the second top knob 700 could have more or less components.

In the embodiment shown in FIGS. 24-27, the first dial 602 of the first top knob 600 has a central bore 708. The second top locking gear 706 has a shoulder 710 that separates a second upper post 712 from a second lower post 714. The central bore 708 is sized and shaped such that the shoulder 710 of the second top locking gear 706 can be received with in it. The interior of the upper hollow post 612 of the first top locking gear 606 is sized and shaped such that the lower post 714 of the second top locking gear 706 can be received with in it. The lower end 716 of the lower post 714 is sized and shaped so as to fit in and engage the slot 48 at the top 40 of the turret screw 38 such that when the lower post rotates, the turret screw 38 rotates which moves the movable optical element 248. The second top knob could also have rotation limits and indicators such as those described with respect to the first top knob above. The raising and lowering of the second top knob 700 provides a third means of adjusting the screw 38, in addition to the outer knob 268 and first top knob 600, without the use of tools.

In the embodiment shown in FIGS. 24-27, rotation of the second top knob 700 does not directly cause rotation of the top knob 600 or the outer knob 268. However, if desirable, the second top knob 700 could be engaged to either or both of the top knob 600 or the outer knob 268 such that rotation of the second top knob 700 directly causes rotation of either or both of the top knob 600 or the outer knob 268.

Figure 26:
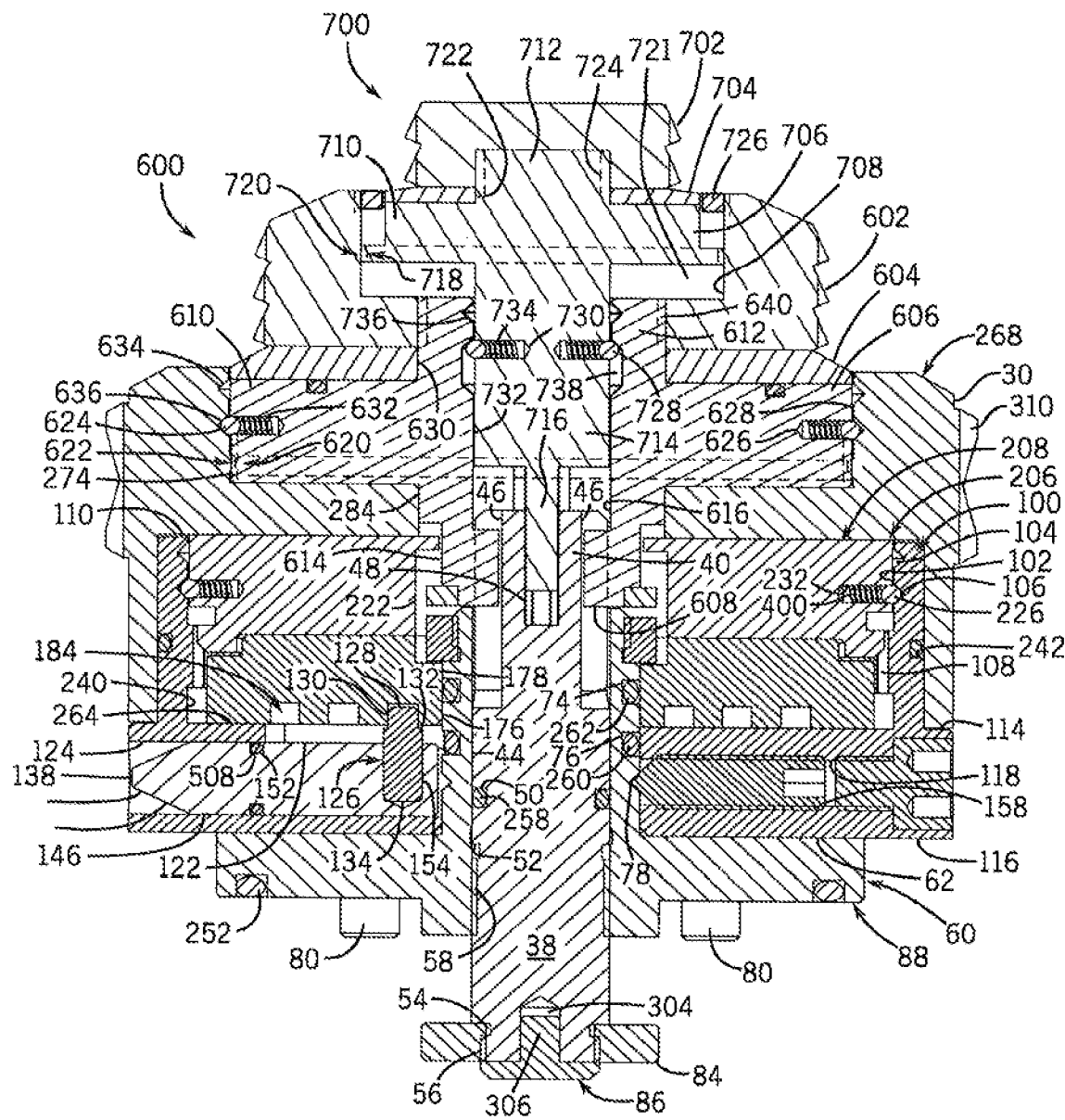
FIG. 26 is a cross-sectional view of the multiple knob turret of FIG. 24 taken along the line 26-26.
Figure 28:
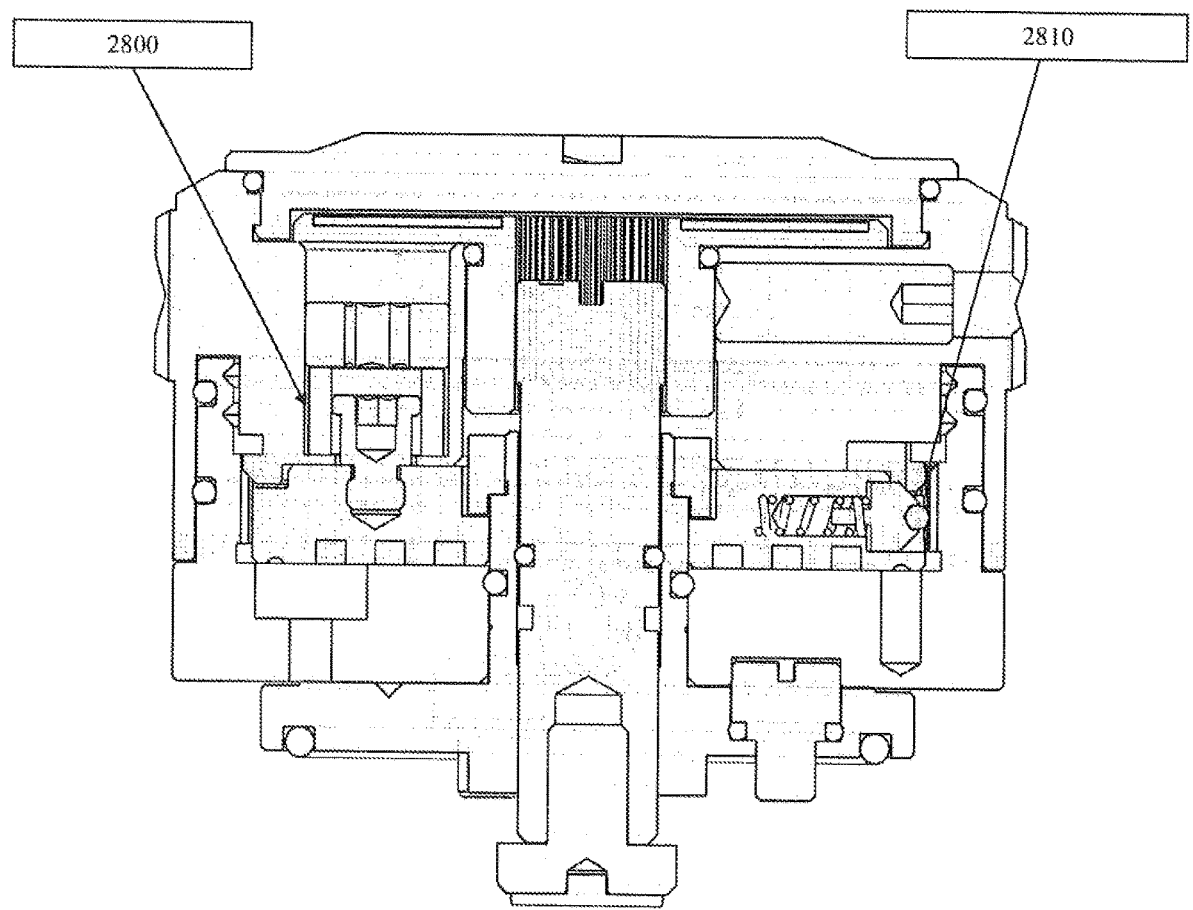
FIG. 28 is a cross-sectional view of a turret in a locked position with a self-centering bushing.

At the outer edge of the shoulder 710 is a toothed surface 718. In one embodiment, the toothed surface 718 has 100 teeth to mesh precisely with 100 teeth of the toothed surface 720 on the interior perimeter of the central bore 708 of the first dial 602 when the second top knob 700 is in its lower position as is seen in FIG. 26. When the second top knob 700 is in its lower or locked position, the interaction between the toothed surfaces 718, 720 prevents the second top locking gear 706 from rotating. When the second top knob 700 is in its raised or unlocked position, as seen in FIG. 28, the toothed surface 718 is no longer engaged with the toothed surface 720 and the second top locking gear 706 is free to rotate, thereby rotating the turret screw 38. The second lower post 714 of the second top locking gear 706 is sized such that when the second top knob 700 is in its lowered position, as see in FIG. 26, there is a space 721 between the bottom of the shoulder 710 and the top of the upper hollow post 612 of the top locking gear 606 and the bottom of the central bore 708 of the first dial 602, such that the first top knob 600 can be lifted to its raised position without lifting the second top knob 700. In the embodiment shown in FIG. 26, the lower post 714 of the second top locking gear 706 rests on the top 40 of the turret screw 38 when the second top knob 700 is in its lowered position.

Figure 27:
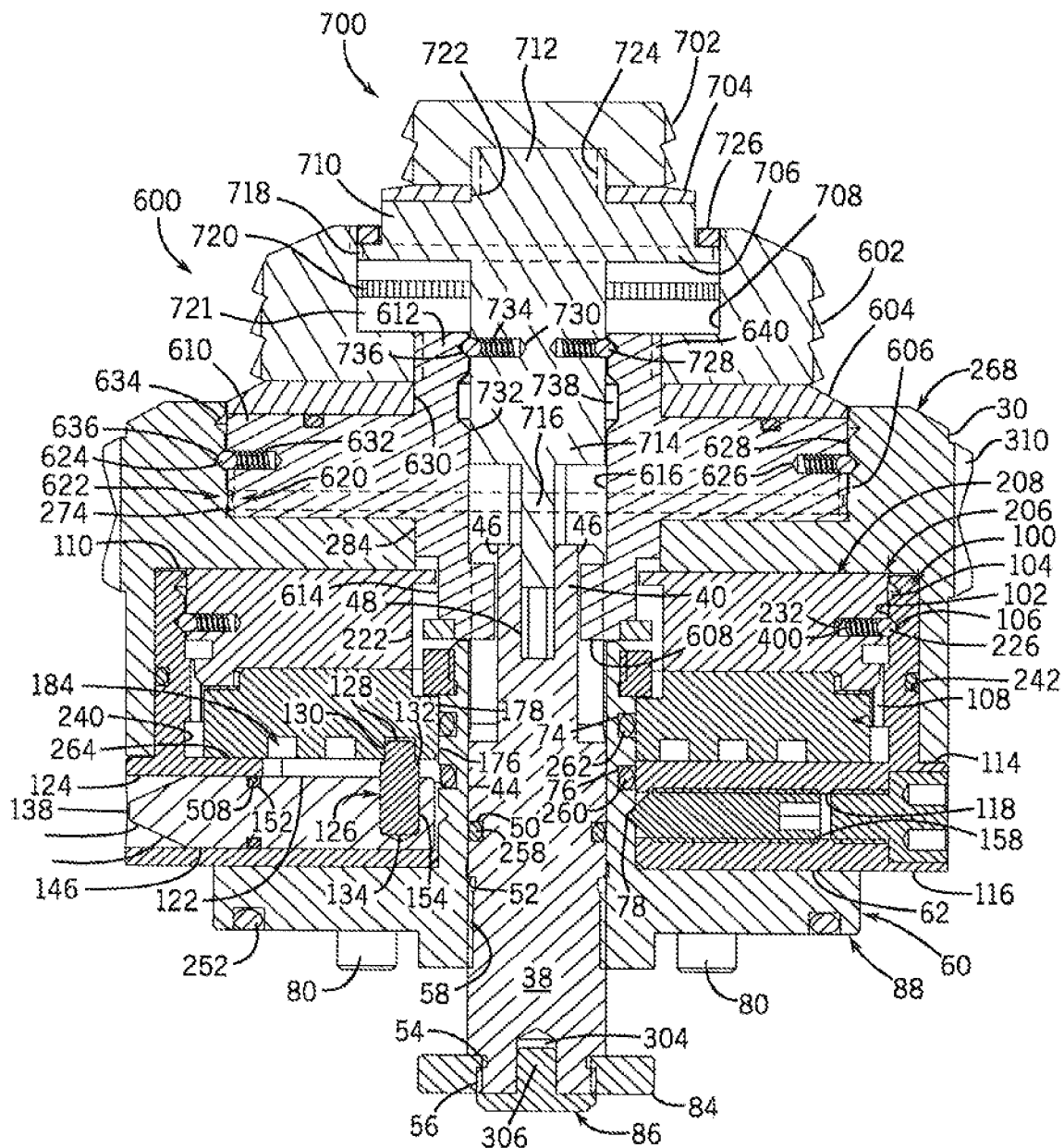
FIG. 27 is a cross-sectional view of the multiple knob turret of FIG. 26 with the second top knob in a raised position.

In order to allow the second top knob 700 to be lifted to its raised position, as seen in FIG. 27, but not removed from the turret 22, the top of the central bore 708 of the first dial 602 is threaded. Once the second top knob 700 is inserted into the first top knob 600, as seen in FIGS. 26-27, a lock washer 726 is threaded into the top of the central bore 708 of the first dial 602 to provide an upper limit as to the amount the second top knob 700 can be raised.

The top of the shoulder 710 provides a seat for the second display 704. The exterior of the second upper post 712 and a central bore 722 of the second display 704 could be threaded such that the second display is screwed onto the second upper post 712 until it is seated on the shoulder 710. The central bore 722 of the second display 704 could alternatively be smooth and slid onto the second upper post 712. The second dial 702 has a threaded bore 724, which screws onto the threaded second upper post 712 to sandwich and thereby releasably retain the second display 704 together with the second top locking gear 706. The dial 702 also allows the display 704 to be changed without the use of tools.

Because the second display 704 can be removed from the top knob 700 by unscrewing the second dial and sliding the second display off of the second upper post 712 if not threaded, or unscrewed if threaded, the second display can be conveniently and quickly replaced with another second display without the use of tools.

Four ball bearings 728 protrude outwards from bores 730 in the exterior perimeter 732 of the second top locking gear 706 located between the toothed surface 718 and the top of the shoulder 710. Springs 734 behind the ball bearings 728 outwardly bias the ball bearings such that the ball bearings engage with the upper click groove 736 and lower click groove 738 on the central bore 708 of the dial 602. When the second top locking gear 706 rises and lowers as the second top knob 700 is unlocked and locked, the ball bearings 728 travel between the lower and upper click grooves 738, 736, thereby providing a vertical, resistant force and making a characteristic clicking sound.

A multiple knob turret could be used, for example during hunting. A hunter may have previously sighted in his or her gun so that the outer knob 268 is sighted in for a select range, for example, 100 yards. If a hunter sees a desired target at 200 yards, the hunter may rotate the outer knob 268 such that the weapon will be set to accurately hit the desired target at 200 yards.

If the gun was sighted in under conditions different than the then current hunting conditions, the hunter could use the first top knob 600 and/or the second top knob 700 to further refine the accuracy of the gun. For example, if the hunter is using a different type of bullet than was used to sight in the gun, the amount of drag on the bullet being used for hunting may be different than the bullet used to sight in the gun. If the difference in drag is known or can be estimated, the hunter may be able to use the first top knob 600 to adjust for the difference in drag, provided the display 604 includes a scale appropriate for the adjustment of such drag.

To adjust the first top knob 600, one may pull up on the first top knob, such as by holding the outer perimeter of the first dial 602 and pulling up. As previously described, when the first top knob 600 is in the raised or unlocked position, the first top knob may be rotated.

Similarly, if the gun was sighted in at an elevation different than different than the then current elevation at the hunting location, the hunter could use the second top knob 700 to even further refine the accuracy of the gun. If the difference in elevation is known or can be estimated, the hunter may be able to use the second top knob 700 to adjust for the difference in elevation, provided the display 704 includes a scale appropriate for the adjustment of such elevation.

To adjust the second top knob 700, one may pull up on the second top knob, such as by holding the outer perimeter of the second dial 702 and pulling up. As previously described, when the second top knob 700 is in the raised or unlocked position, the second top knob may be rotated.

The ability to raise the first top knob 600 and/or second top knob 700 without the use of tools is a significant advantage over current turrets. The ability to raise the first and/or second top knob with the use of ones hands eliminates the need to carry tools during use, is quicker and easier than current turrets that require tools and reduces the potential for alerting a target.

Further, when the first top knob 600 and/or second top knob 700 is in a lowered or locked position, the first and/or second top knob cannot be rotated and is protected from unintentional and undesirable rotation of the knob such as if bumped.

The cooperation of the first top knob 600 and/or second top knob 700 with the stop surfaces 198, 200 also prevents adjustment of the knobs beyond preset amounts and helps prevent the loss of how many rotations are dialed in. The addition of the rotation indicator 136 also helps one keep track of how many rotations are dialed in even in conditions where it is hard to see.

The first top knob 600 and/or second top knob 700 also allows the turret to adjust the screw and, thereby, the optical element for different scales through the tool-less switching of displays with different scales. The cooperation of the outer knob with the first top knob 600 and/or second top knob 700 allows one turret to be able to adjust the screw and, thereby, the optical element for different scales without the use of tools.

FIG. 28 depicts a turret in a locked position with self-centering bushings 2800 to prevent binding caused by any minor mis-alignment of the corresponding guide rods. Meshed splines 2810 are indicated. Components in FIG. 28 are similar to the components shown in FIGS. 5A and 5B, with the exception of the bushing 2800. The bushing 2800 permits passage of the turret screw subassembly through an elevation cam disc.

The floating bushings 2800 afford more tolerance in the case of a turret that is actuated at a slight angle from its axis, preventing binding of the turret during actuation.

Figure 29:
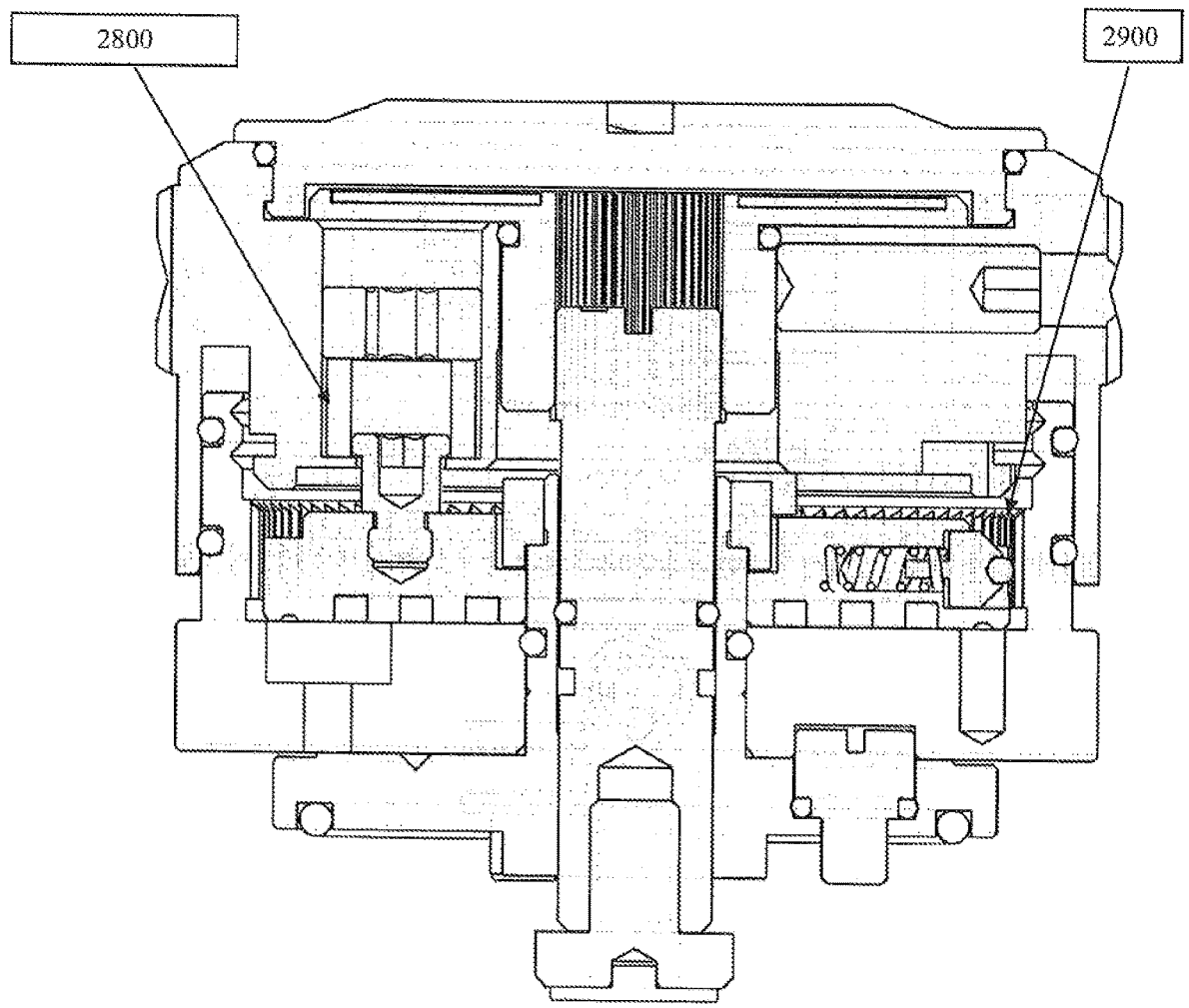
FIG. 29 is a cross-sectional view of a turret in an unlocked position with a self-centering bushing.

FIG. 29 depicts a turret in an unlocked position with self-centering bushings 2800 to prevent binding caused by minor mis-alignment of the corresponding guide rods. Unmeshed splines 2910 are shown.

While multiple embodiments of the rifle scope turret with adjustment stops, rotation indicator, locking mechanism and/or multiple knobs have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A rifle scope comprising:
a scope body;
a moveable optical element defining an optical axis connected to the scope body;
a turret having a screw defining a screw axis and operably connected to the optical element for changing the optical axis in response to rotation of the screw;
a spiral cam mechanism comprising a stop element and connected to the screw and having a bushing configured to permit passage of the screw;
the stop element defining a guide surface wrapping about the screw axis and terminating at first and second ends;
a cylindrical body operable to engage the guide surface, and to engage the first and second ends, the engagement of the first and second ends defining rotational limits of the turret; wherein each of the first and second ends are at different radial distances from the screw axis.

2. The rifle scope of claim 1 wherein the guide surface is defined by a channel.

3. The rifle scope of claim 2 wherein the stop element has a planar surface perpendicular to the screw axis, and the channel is defined in the planar surface.

4. The rifle scope of claim 1 wherein the guide surface includes a plurality of concentric arcs each centered on the screw axis and substantially encompassing the screw axis, the guide surface including a transition segment connecting an end of a first one of the plurality of concentric arcs to an end of a second one of the plurality of concentric arcs, such that a stepped spiral is formed.

5. A rifle scope with spiral cam mechanism comprising:
a scope body;
a moveable optical element defining an optical axis connected to the scope body;
a turret having a screw operably connected to the moveable optical element for adjusting the optical axis in response to rotation of the screw;
a spiral cam mechanism having a bushing configured to permit passage of the screw, the spiral cam mechanism defining a first stop surface positioned for engagement by a cylindrical body to limit rotation of the turret, such that the position at which the cylindrical body engages the first stop surface defines a zero position of the screw and the moveable optical element;
the spiral cam mechanism defining a second stop surface positioned for engagement by a cylindrical body to limit rotation of the turret, such that the position at which the cylindrical body engages the second stop surface defines a maximum point of displacement of the screw and the moveable optical element; wherein the first stop surface and second stop surface are connected by a channel and further wherein the channel comprises a stepped spiral.

6. The rifle scope of claim 5, wherein the first stop surface and second stop surface are recessed portions of the spiral cam mechanism.

7. The rifle scope of claim 5 wherein the cylindrical body is a cam pin.

8. The rifle scope of claim 5, wherein the turret is a windage turret.

9. The rifle scope of claim 8, further comprising a second windage turret.

\* \* \* \* \*